Jan. 24, 1950     S. T. CARTER     2,495,207
LABEL AFFIXING MACHINE

Filed Nov. 15, 1944     22 Sheets-Sheet 1

Inventor
Sidney T. Carter
by Roberts Cushman & Grover
Att'ys.

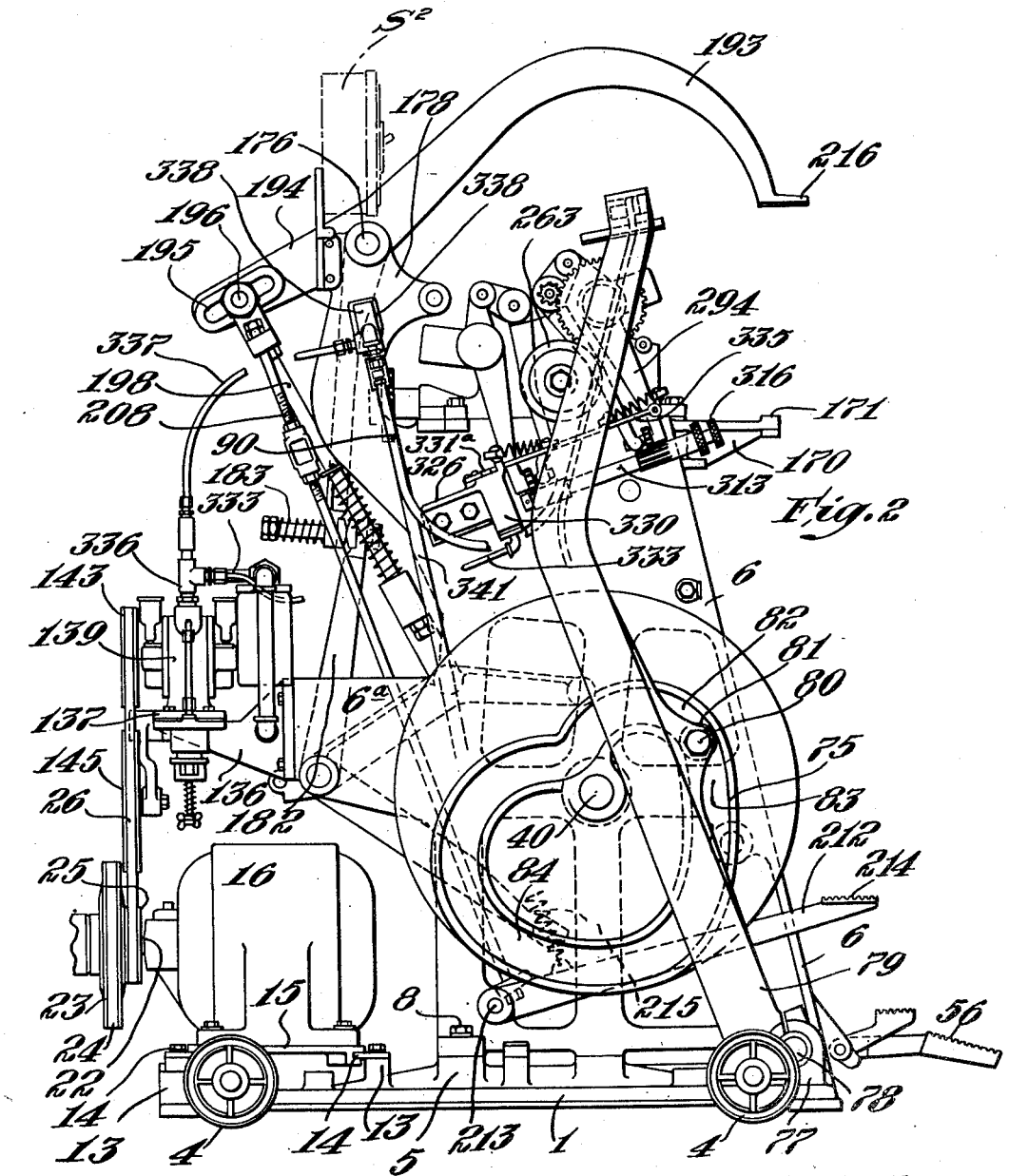

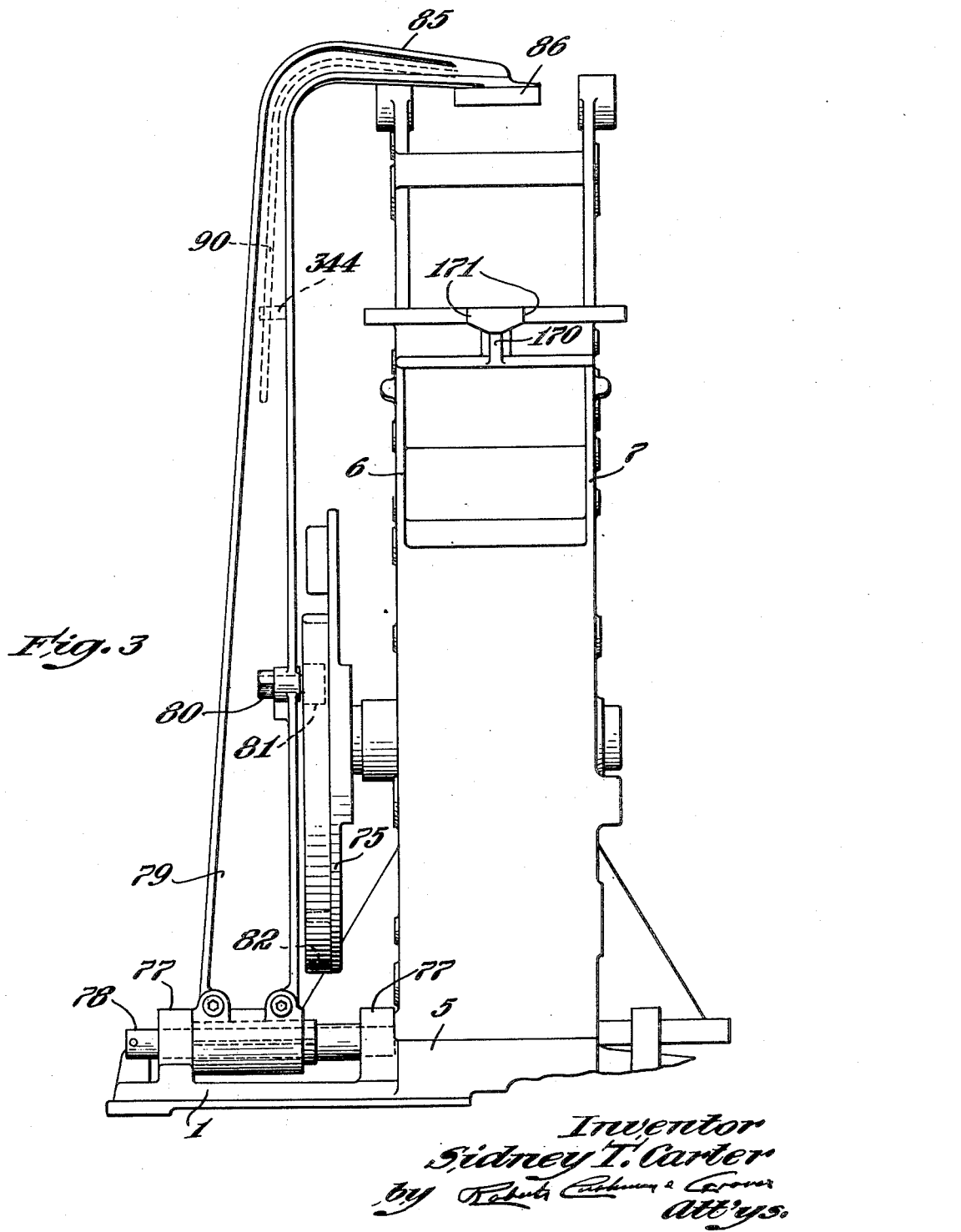

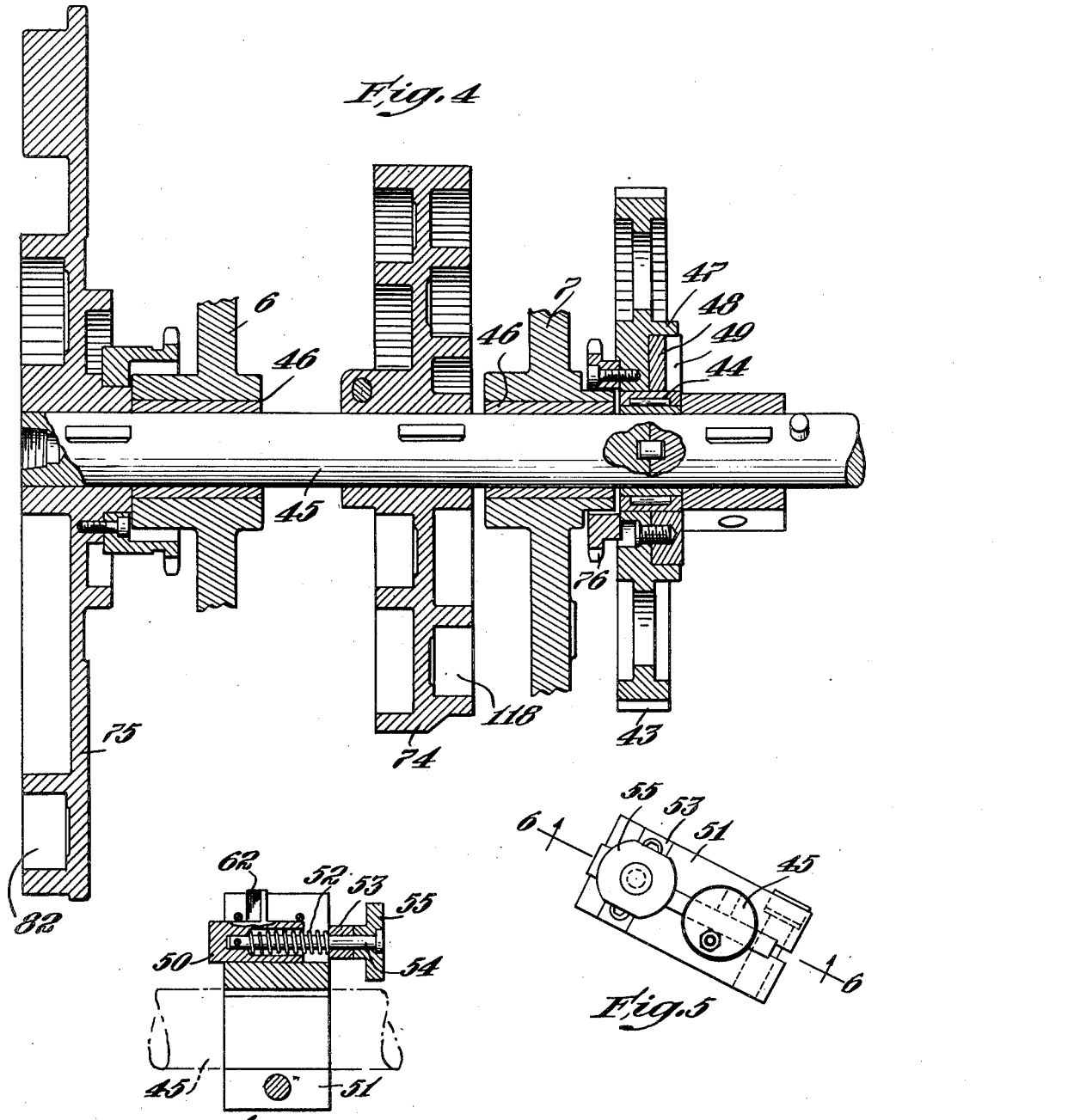

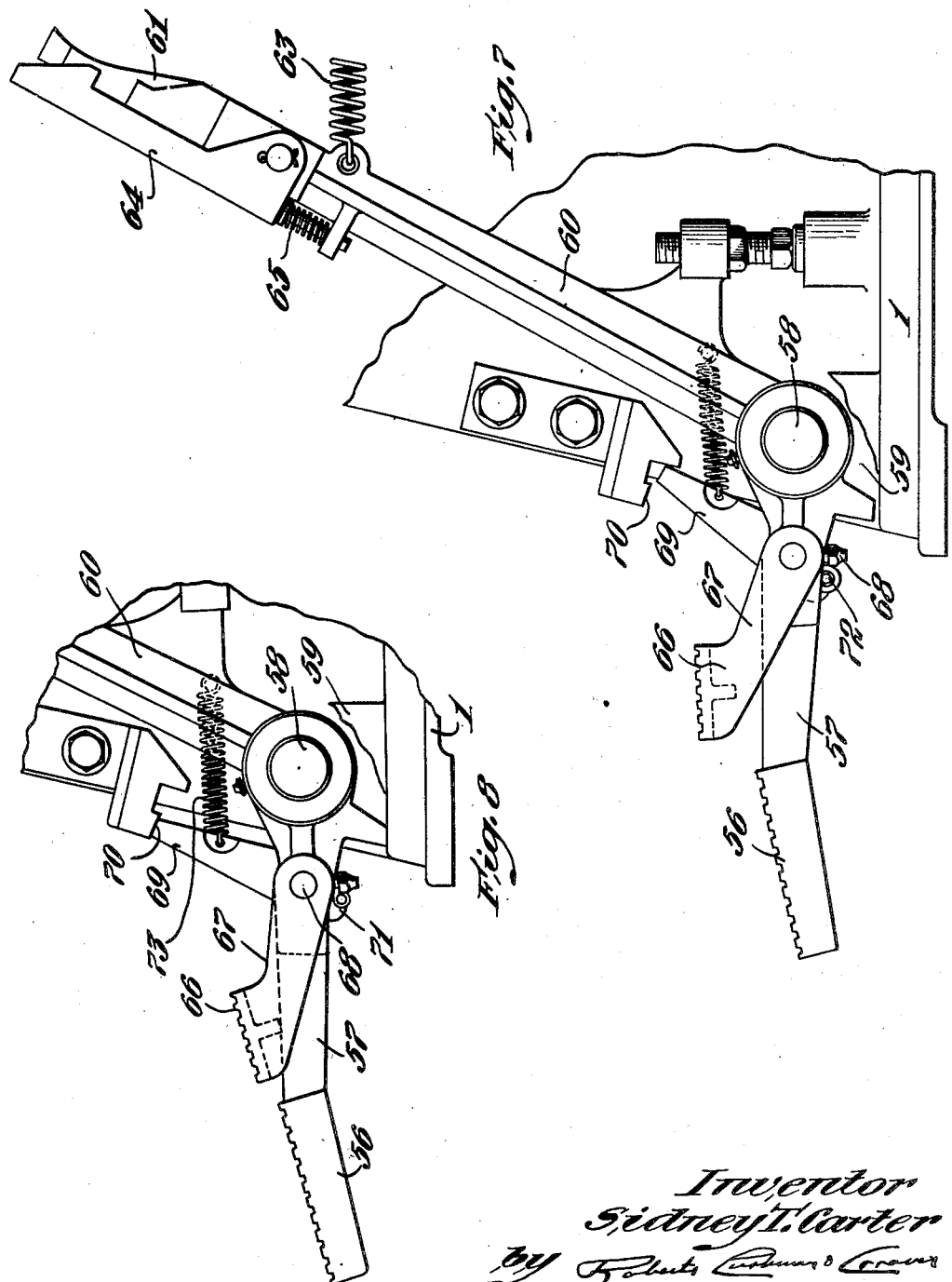

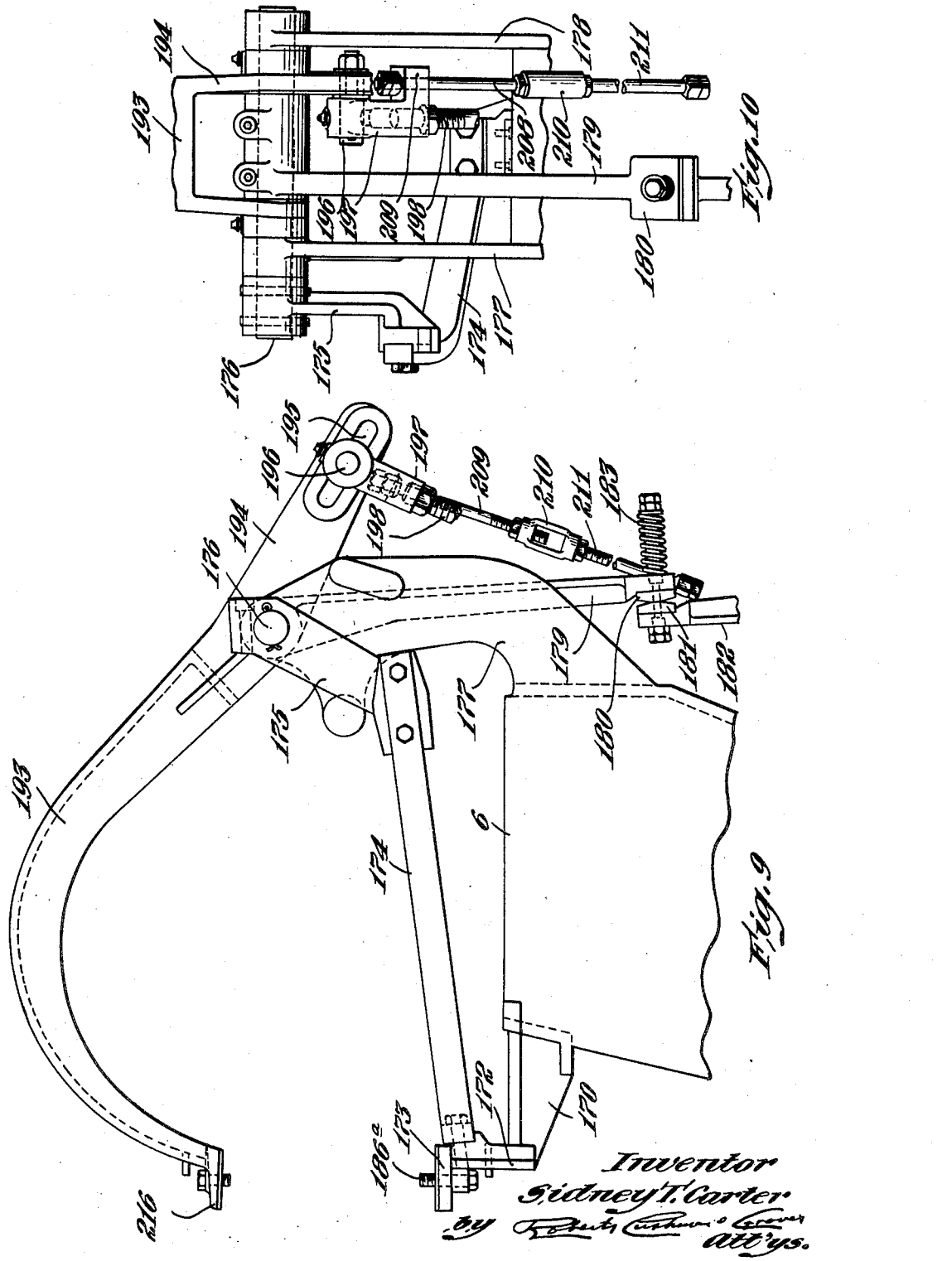

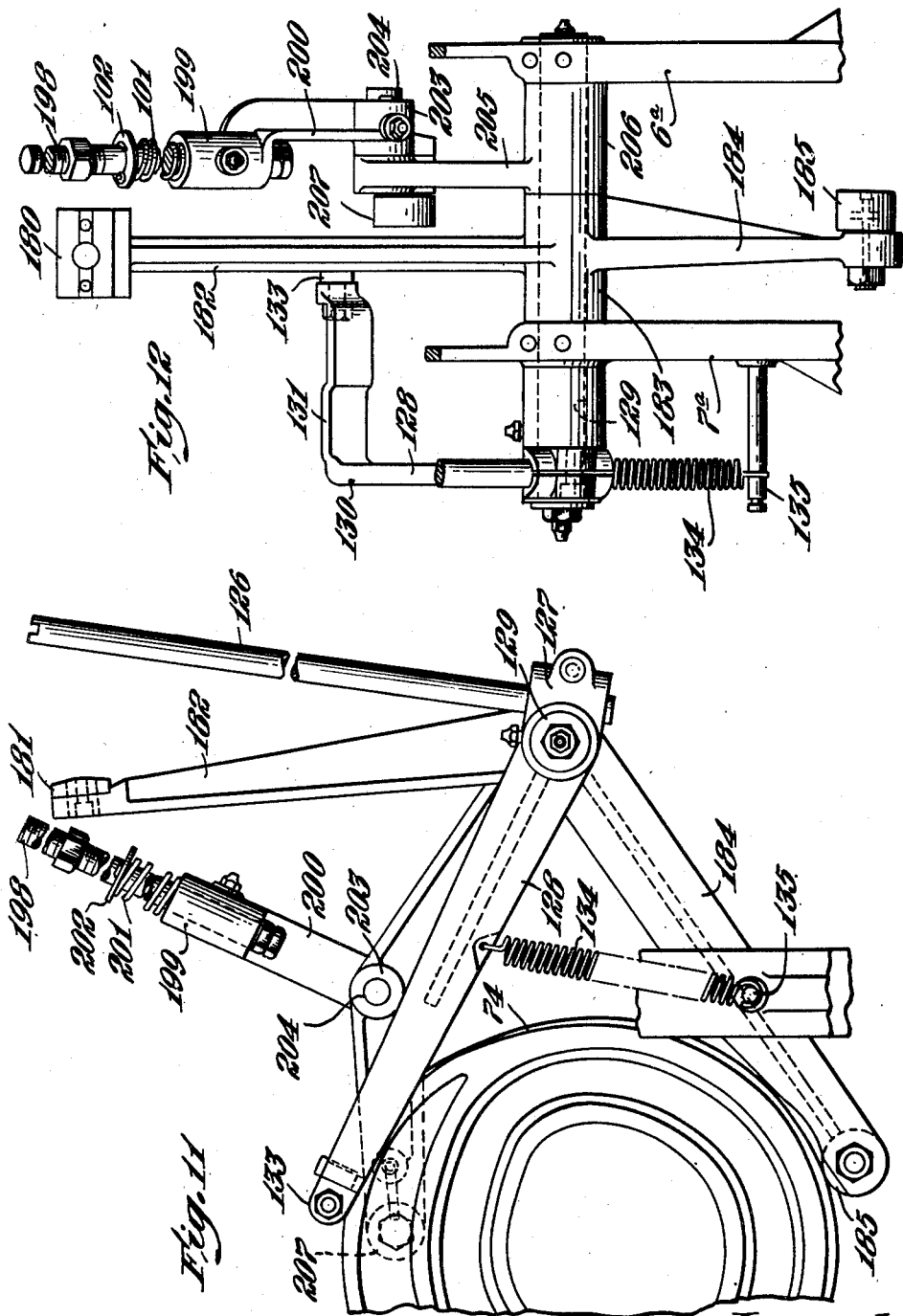

Jan. 24, 1950   S. T. CARTER   2,495,207
LABEL AFFIXING MACHINE
Filed Nov. 15, 1944   22 Sheets-Sheet 8

Inventor
Sidney T. Carter
by Roberts Cushman & Grover
att'ys.

Jan. 24, 1950
S. T. CARTER
2,495,207
LABEL AFFIXING MACHINE
Filed Nov. 15, 1944
22 Sheets-Sheet 9
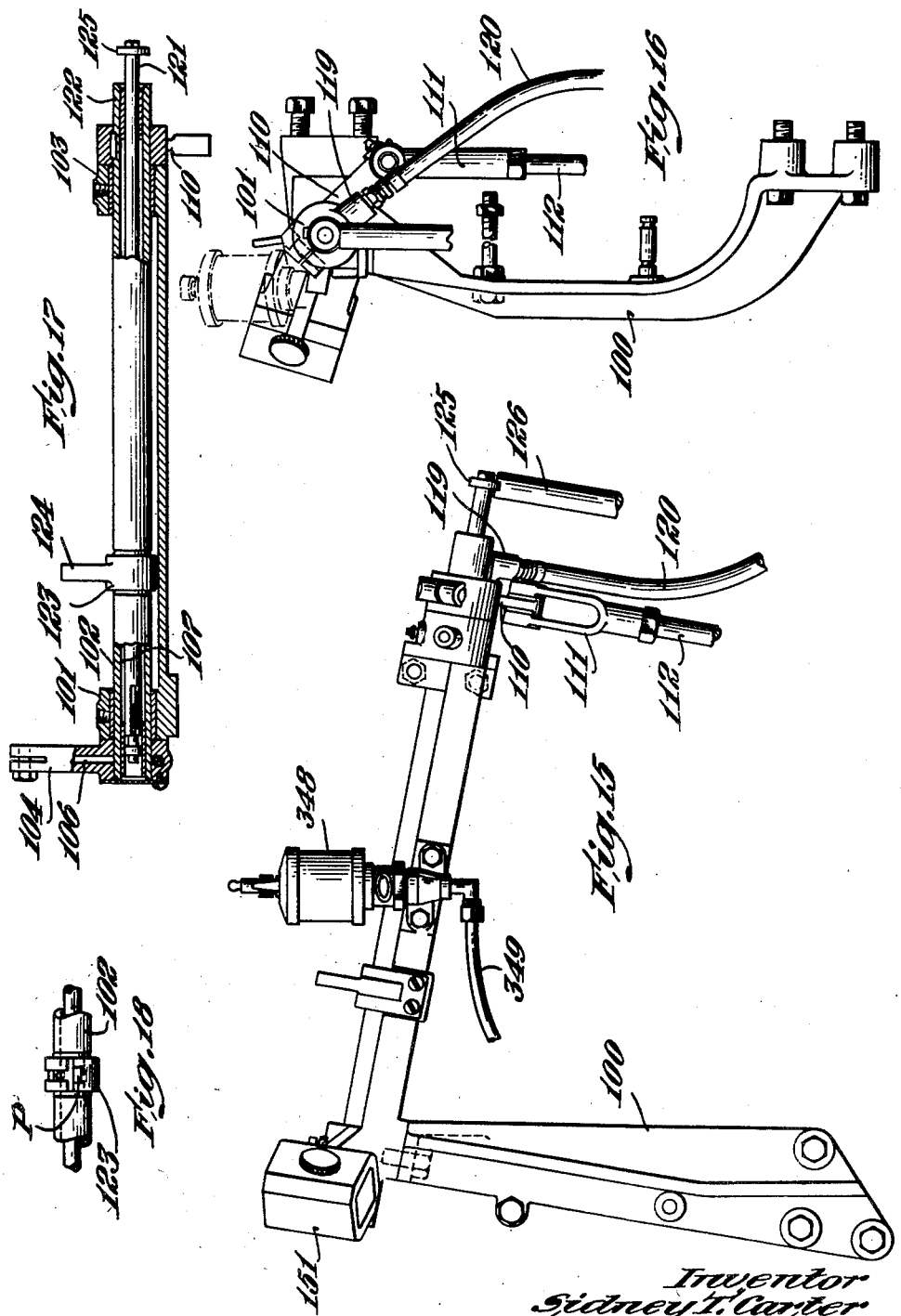

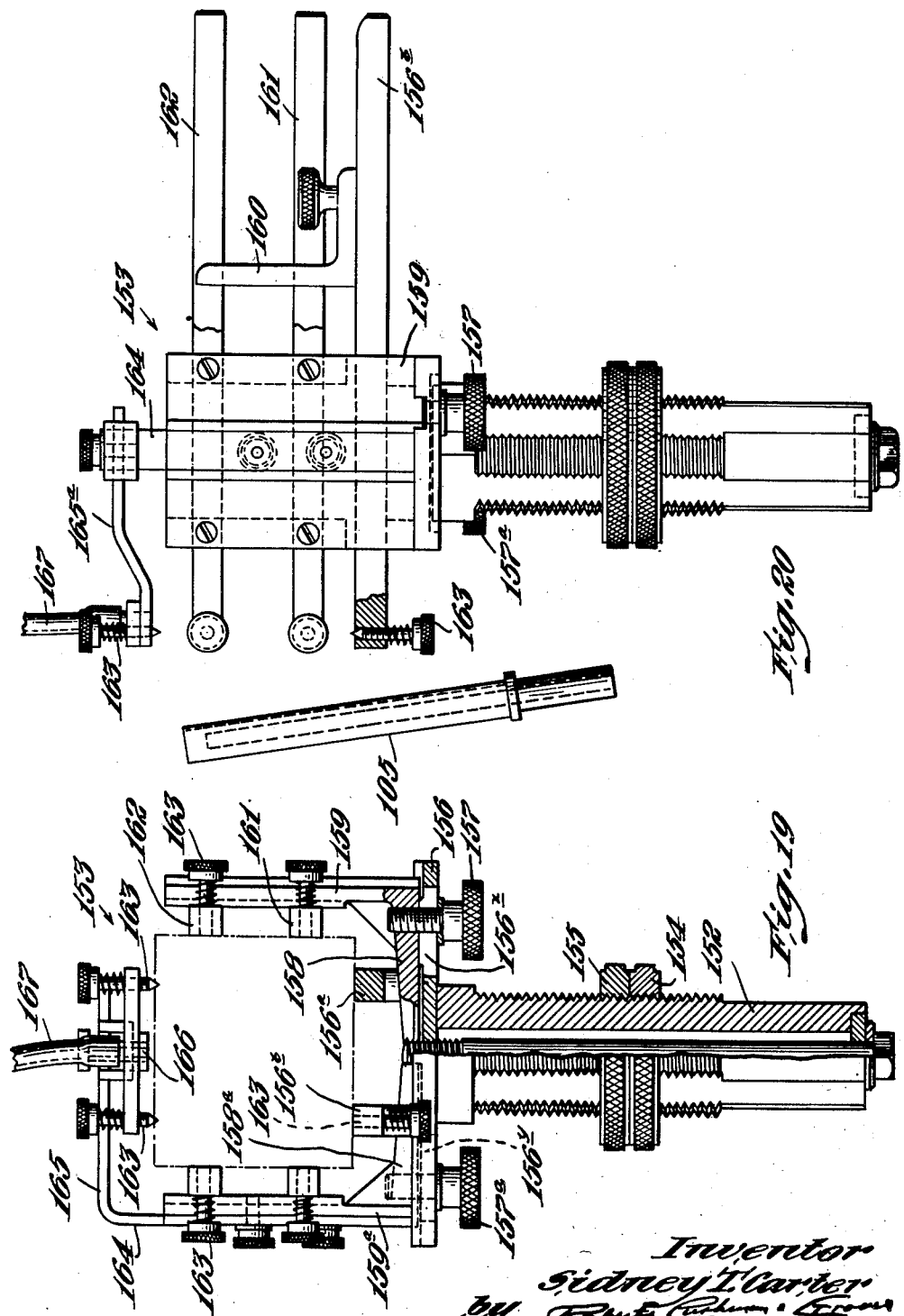

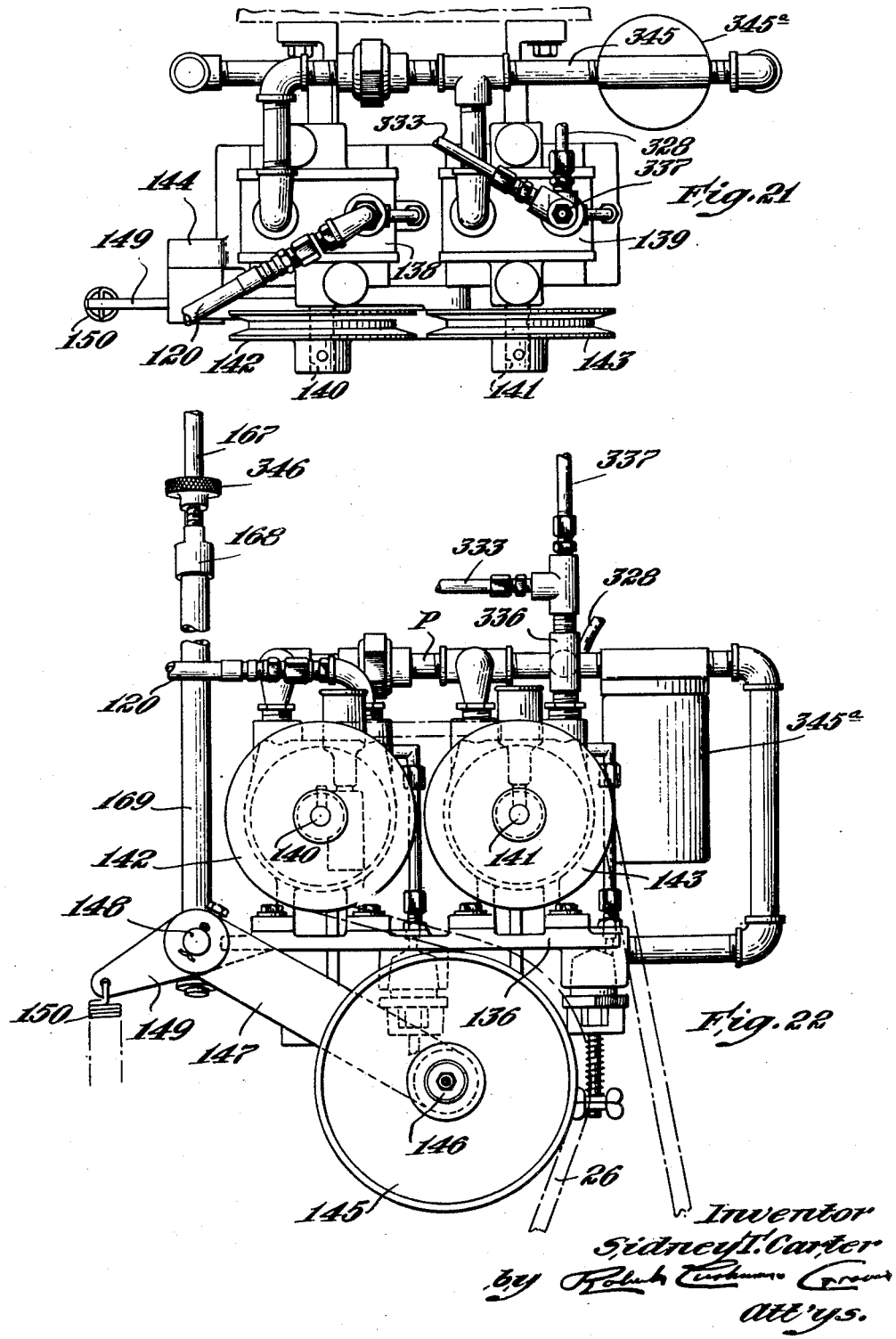

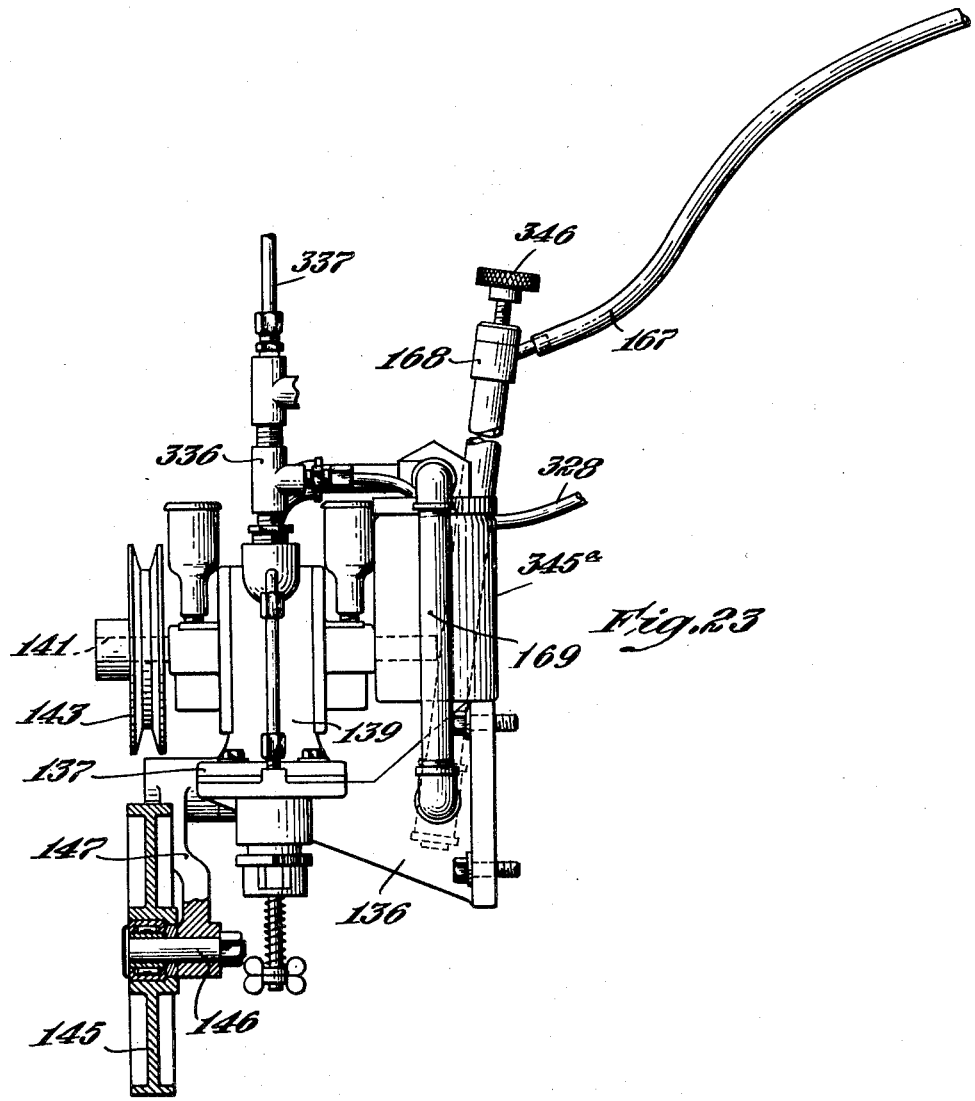

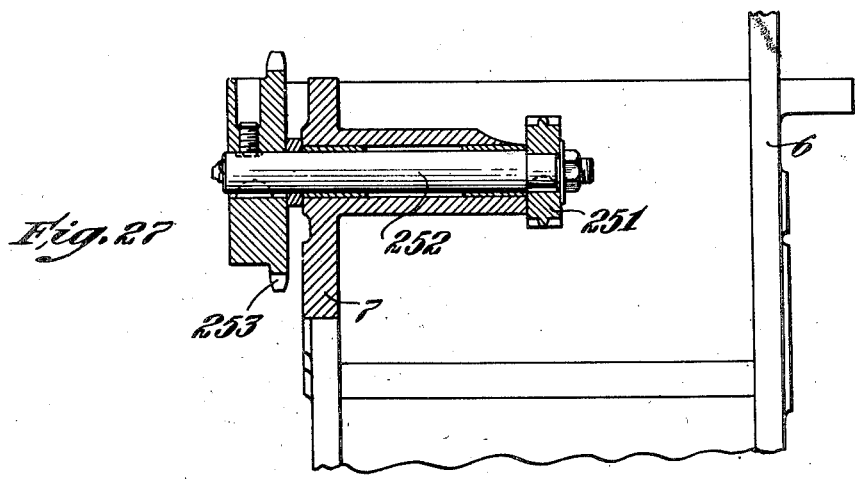
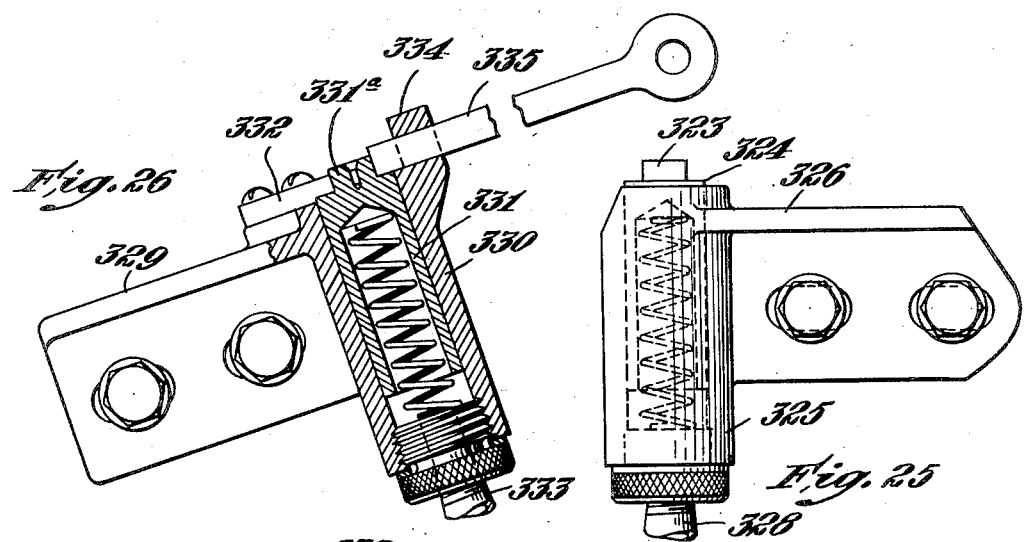
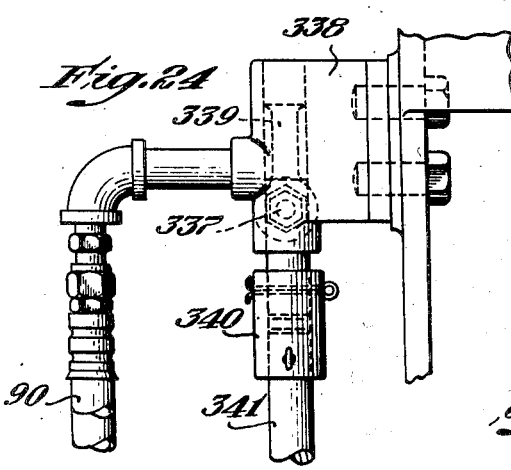

Jan. 24, 1950     S. T. CARTER     2,495,207
LABEL AFFIXING MACHINE

Filed Nov. 15, 1944     22 Sheets-Sheet 14

Inventor
Sidney T. Carter
by Roberts Cushman & Grover
att'ys.

Jan. 24, 1950   S. T. CARTER   2,495,207
LABEL AFFIXING MACHINE
Filed Nov. 15, 1944   22 Sheets-Sheet 15

Inventor
Sidney T. Carter
by Roberts Cushman Grover
att'ys.

Jan. 24, 1950 S. T. CARTER 2,495,207
LABEL AFFIXING MACHINE
Filed Nov. 15, 1944 22 Sheets-Sheet 17

Inventor
Sidney T. Carter
by
Att'ys.

Jan. 24, 1950   S. T. CARTER   2,495,207
LABEL AFFIXING MACHINE
Filed Nov. 15, 1944   22 Sheets-Sheet 18
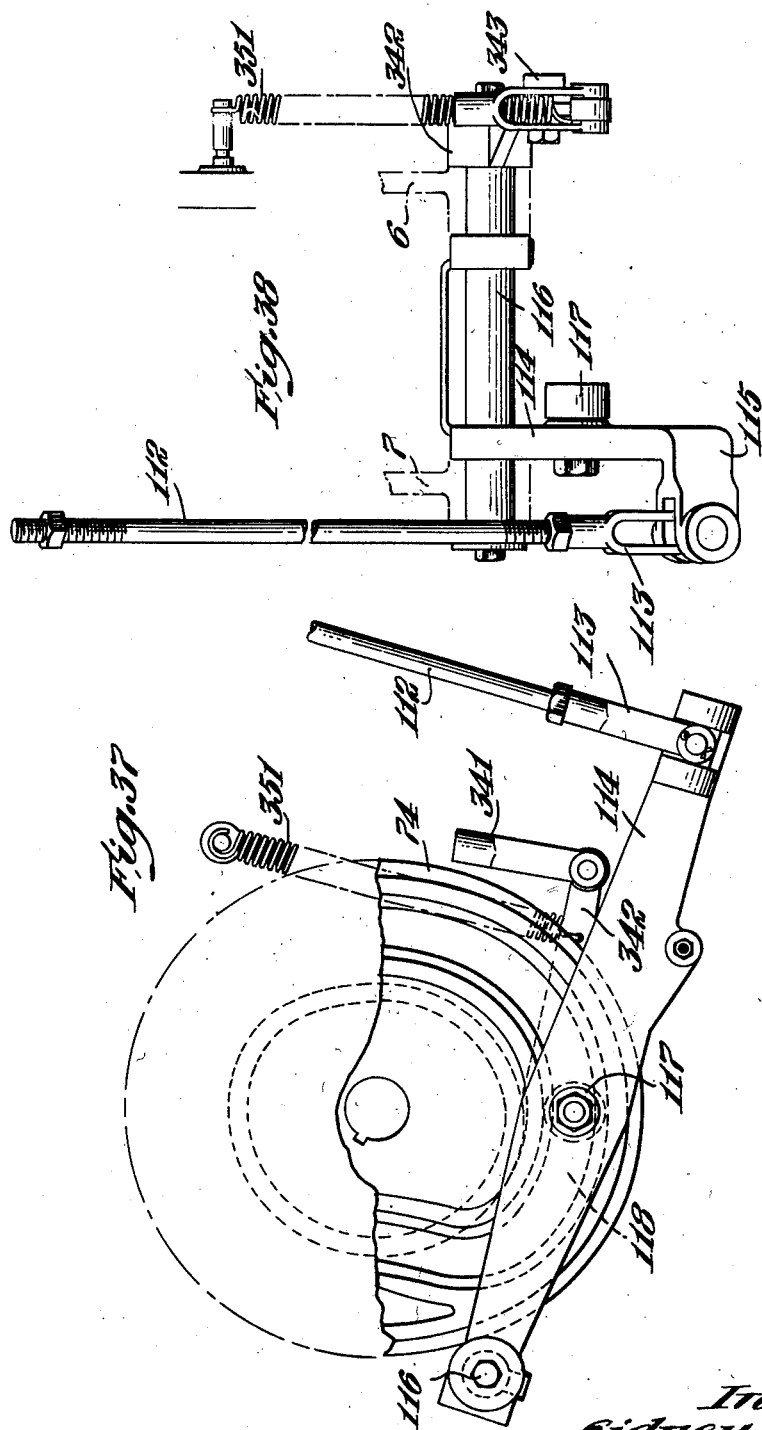

Jan. 24, 1950     S. T. CARTER     2,495,207
LABEL AFFIXING MACHINE

Filed Nov. 15, 1944     22 Sheets-Sheet 19

Inventor
Sidney T. Carter
by
Att'ys.

Jan. 24, 1950 S. T. CARTER 2,495,207
LABEL AFFIXING MACHINE
Filed Nov. 15, 1944 22 Sheets-Sheet 20
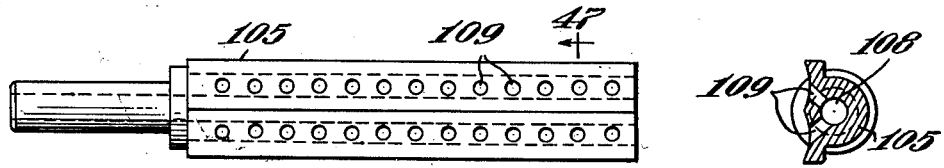
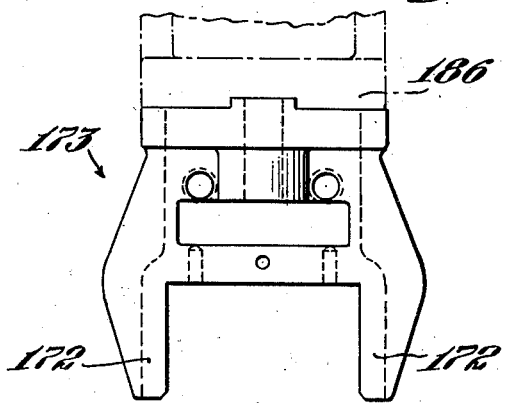
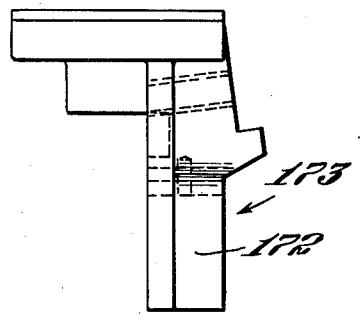
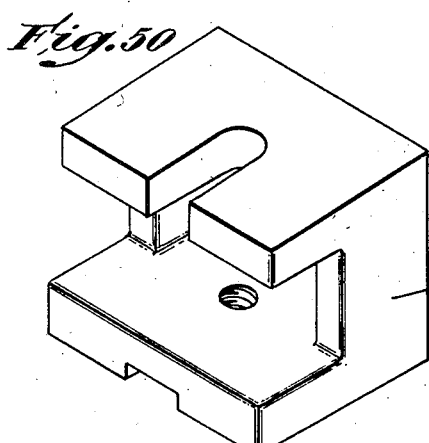
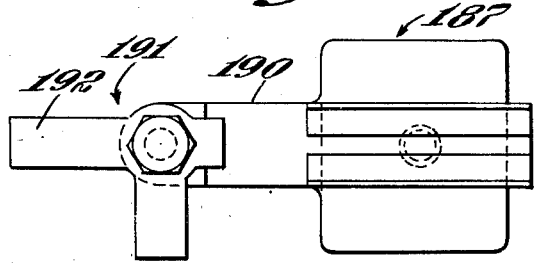
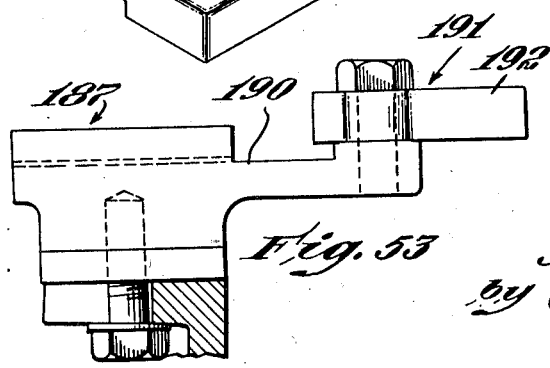
Inventor
Sidney T. Carter
by Roberts Cushman & Groover
att'ys.

Jan. 24, 1950      S. T. CARTER      2,495,207
LABEL AFFIXING MACHINE
Filed Nov. 15, 1944      22 Sheets-Sheet 21
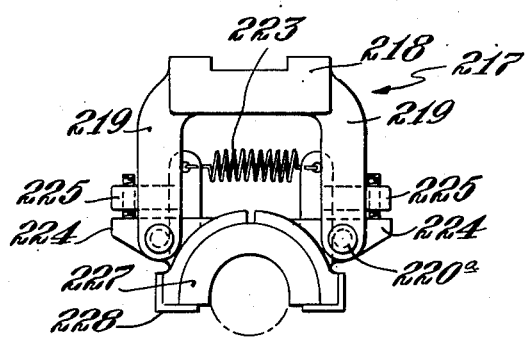
Fig. 54
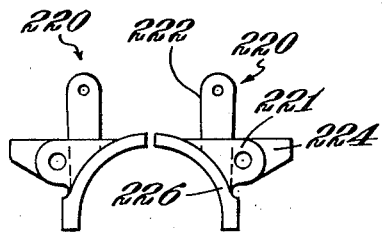
Fig. 55
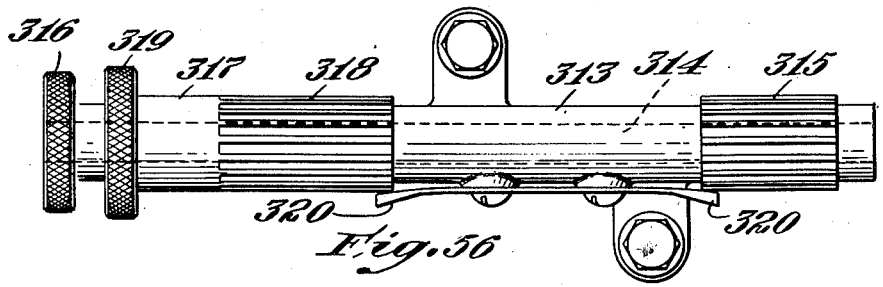
Fig. 56
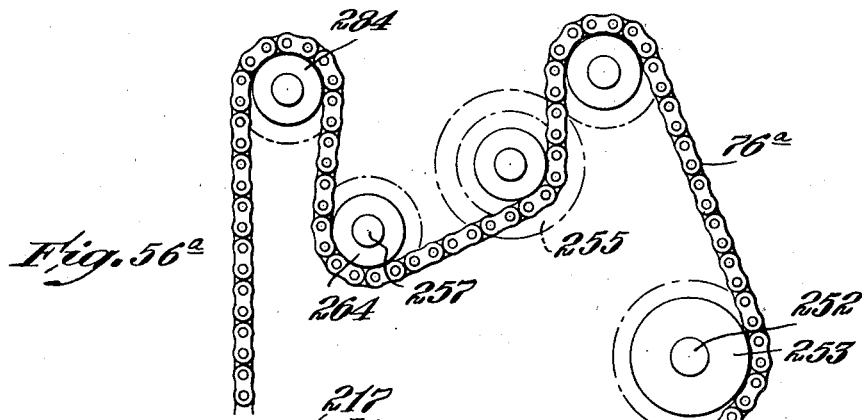
Fig. 56a
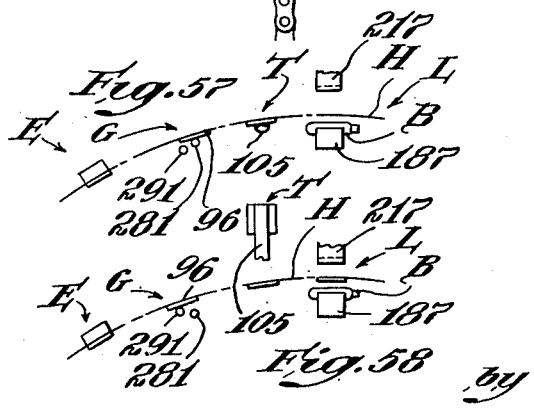
Fig. 57
Fig. 58
Inventor
Sidney T. Carter
by Roberts Cushman Carver
att'ys.

Patented Jan. 24, 1950

2,495,207

UNITED STATES PATENT OFFICE 2,495,207

LABEL AFFIXING MACHINE

Sidney T. Carter, Worcester, Mass., assignor to Economic Machinery Company, Worcester, Mass., a corporation of Massachusetts Application November 15, 1944, Serial No. 563,606

14 Claims. (Cl. 216—55)

This invention pertains to label-applying machines, more especially to machines of the type designed automatically to withdraw a label from a magazine, applying gum to one side of the label, contact the gummed surface of the label with the article to which the label is to be applied, and applying pressure to insure firm adhesion of the label to the article.

A machine of this general type is disclosed in the patent to Sjoberg et al., No. 2,292,093, dated August 4, 1942, the machine of the present invention operating on substantially the same cycle as the Sjoberg machine. The present invention concerns certain improvements having as their general object the provision of a machine which is very certain and accurate in operation; smooth and substantially free from vibration in its operative movements and having a long useful life; having provision for accurate adjustment of the thickness of the adhesive film applied to the label regardless of the size of label being used; having improved means for supplying and applying the gum; having provision for readily cleaning the gum-supplying and applying means; and improved safety devices operative to prevent the accidental application of gum to the label transferring elements.

Other and further objects and advantages of the invention will be pointed out hereinafter in the following more detailed description and by reference to the accompanying drawings, wherein Fig. 1 is an elevation, with certain parts broken away and others omitted, of the right-hand side of the machine, the casing having been removed;

Fig. 2 is an elevation similar to Fig. 1 but showing the left-hand side of the machine;

Fig. 3 is a fragmentary front elevation of the machine frame also showing the supporting lever for the label carrier and its actuating cam;

Fig. 4 is a fragmentary vertical section on the axis of the main cam shaft, viewed from the front, showing parts of the drive clutch;

Fig. 5 is an elevation showing the right-hand side of the drive clutch control arm;

Fig. 6 is a section substantially on the line 6—6 of Fig. 5;

Fig. 7 is a fragmentary elevation, to larger scale than Fig. 1, illustrating parts of the clutch-actuating mechanism;

Fig. 8 is a similar view, showing parts of the mechanism of Fig. 7 in a different position;

Fig. 9 is a fragmentary right-hand side elevation showing the work-supporting and label-presser actuating levers;

Fig. 10 is a rear elevation of the parts shown in Fig. 9;

Fig. 11 is a fragmentary right-hand side elevation of certain of the actuating levers and cams;

Fig. 12 is a rear elevation of the parts shown in Fig. 11;

Fig. 15 is a fragmentary side elevation showing the magazine support and the picker shaft bearings;

Fig. 16 is a rear elevation of the parts shown in Fig. 15;

Fig. 17 is a plan, partly in horizontal section, of the picker shaft bearing and the picker shaft and picker control valve;

Fig. 18 is a fragmentary plan view illustrating a manually actuable relief valve for the picker mechanism;

Fig. 19 is a front elevation, partly in section, of the label magazine;

Fig. 20 is a right-hand side elevation of the magazine and also showing the picker in the position which it occupies as it approaches the magazine;

Fig. 21 is a plan view of the pump assembly;

Fig. 22 is a rear elevation of the pump assembly;

Fig. 23 is a left-hand elevation of the pump assembly;

Fig. 24 is a left-hand elevation showing the control valve for the label carriage pad;

Fig. 25 is a right-hand elevation of the right-hand safety latch for the gumming rolls;

Fig. 26 is a vertical section through the left-hand safety latch for the gumming rolls;

Fig. 27 is a fragmentary vertical section illustrating the drive for the gum pick-up disks;

Fig. 37 is a fragmentary side elevation of the picker-actuating lever and cam;

Fig. 38 is a rear elevation of the parts shown in Fig. 37;

Fig. 46 is a bottom view of the label picker;

Fig. 47 is a section on the line 46—46 of Fig. 45;

Fig. 48 is a front elevation of the article rest carriage, showing a portion of a spacer member in broken lines;

Fig. 49 is a side elevation of the article rest carriage;

Fig. 50 is a perspective view of a spacer member;

Fig. 51 is a plan view of the article rest;

Fig. 52 is a front elevation of the article rest;

Fig. 53 is a side elevation of the article rest;

Fig. 54 is a front elevation, with certain parts omitted, of the label pressing and wiping devices;

Fig. 55 is a front elevation showing the wiper elements separate from their support;

Fig. 56 is a side elevation of one of the roll-adjusting shafts and its bearings;

Fig. 56a is a fragmentary elevation of the drive chain at the right-hand side of the machine, showing some of the several sprockets with which it engages;

Figs. 57 and 58 are diagrams illustrating the arcuate path of motion of the label carriage;

Frame and drive

Figure 13:
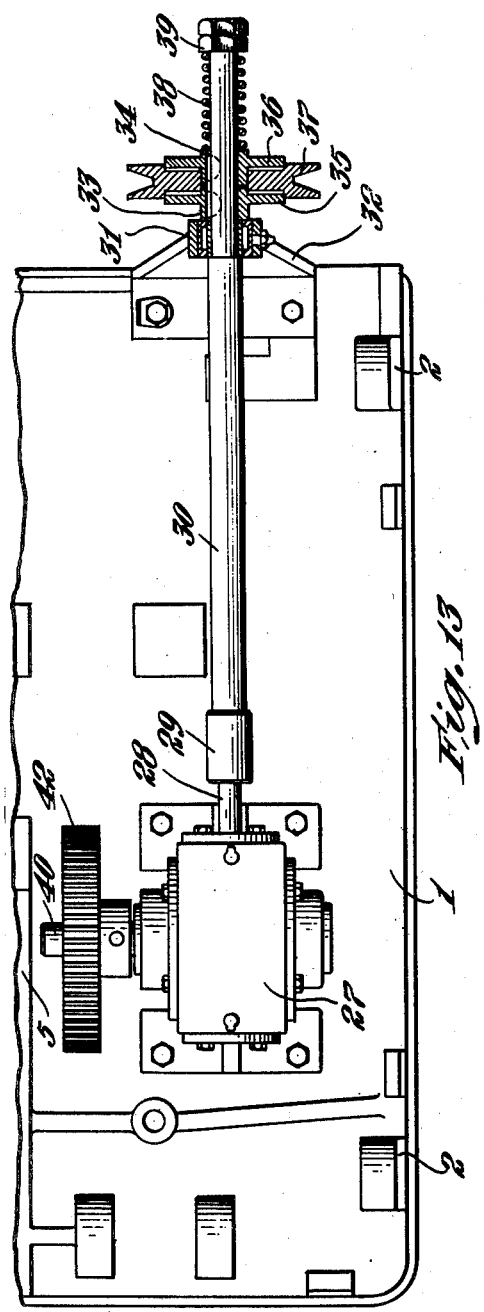
Fig. 13 is a fragmentary plan view of the machine base showing the drive shaft and reducing gearing.
Figure 14:
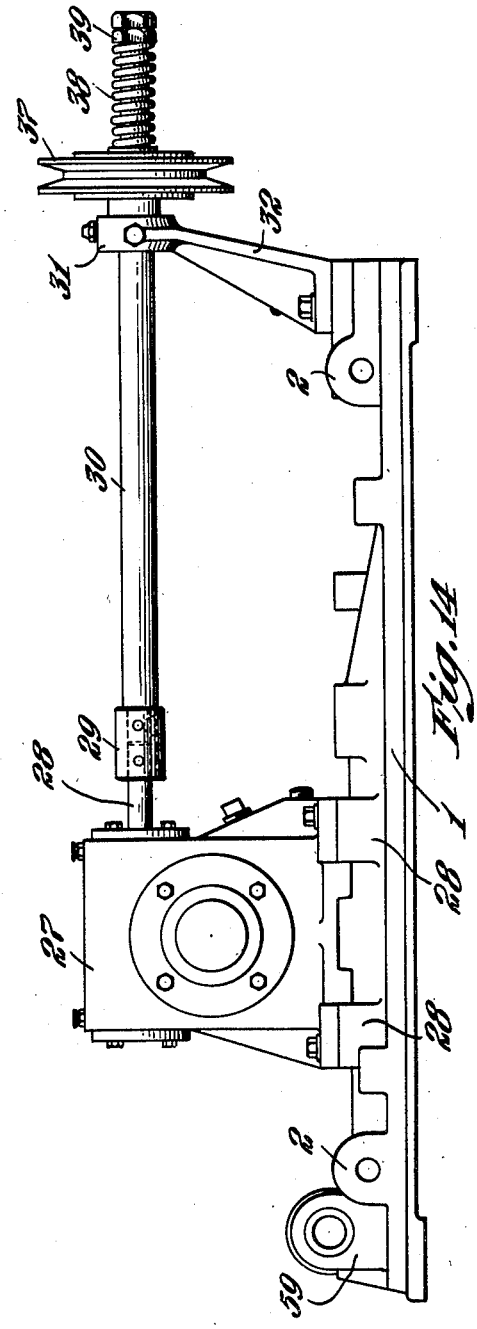
Fig. 14 is an elevation of the parts shown in Fig. 13.
Figure 29:
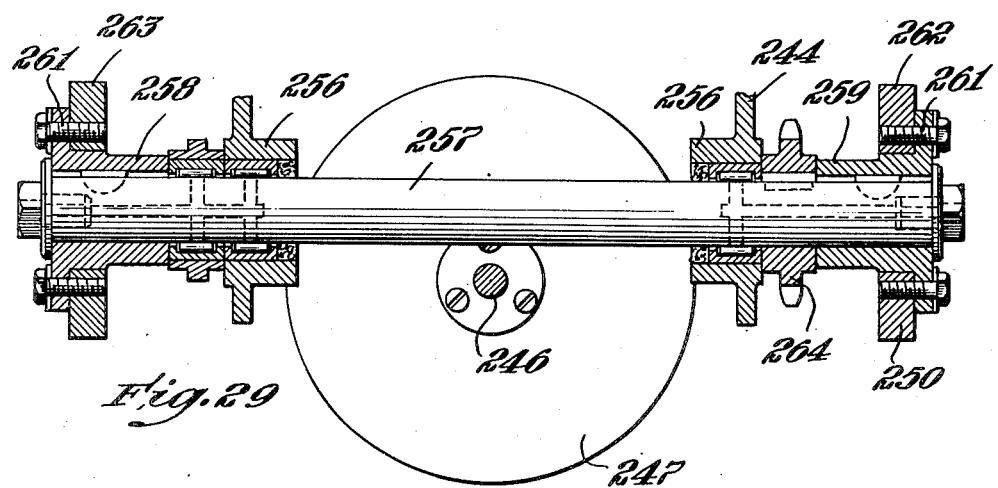
Fig. 29 is a fragmentary sectional view substantially at right angles to the plane of Fig. 28.

Referring to the drawings (Figs. 1, 2, 13, 14 and 39) the numeral 1 designates a rigid base plate, for example a casting, here shown as provided at its corners with upstanding bosses 2 which receive stub shafts 3 on which turn the truck wheels 4 which support the machine and facilitate moving it from place to place. The base plate 1 also has a pair of parallel upstanding bosses 5 (Figs. 3 and 13) whose upper surfaces are suitably finished to form supports for a box column comprising right and left spaced parallel walls 6 and 7 (Fig. 3). This column, which is here shown as an integral casting, is bolted, for example at 8 (Fig. 2) to the base.

At its rear part, and rearwardly of this box column, the base is provided with upstanding bosses 13 (Figs. 2 and 39) which support parallel tracks 14 (Fig. 2), forming guides for the base 15 of a motor 16. The motor base is pivotally connected at 17 (Fig. 39) to an elongate adjusting yoke 18 having a screw-threaded bore at its free end which receives an adjusting screw 19 having threaded engagement with a bracket 20 secured to a boss 21 carried by the base plate. By turning this screw 19, the position of the motor base 15 on its guide rails 14 may be varied, thereby varying the tension of the driving belt. Preferably the motor shaft carries a variable speed pulley 23 (Figs. 1 and 2) of the automatic type (for instance of the kind forming an element of a so-called "Reeves" drive) which varies its effective diameter in response to variation in belt tension, the linear speed of the belt 24 thus being variable by adjusting the screw 19. The shaft 22 of the motor also carries a pulley 25 which drives a belt 26 for actuating the air pumps, hereafter more fully described.

A speed reduction mechanism 27 (Figs. 1, 13 and 14) which may be of any conventional type, is mounted on bosses 28 carried by the base 1 at the right-hand side of the box column, this speed reduction mechanism having the input shaft 30 which is connected by a coupling 29 to one end of a shaft 28 whose opposite end portion turns in a bearing 31 carried by a bracket 32 upstanding from the base plate 1. On the outboard end of the shaft 30 there are keyed sleeves 33 and 34 (Fig. 13) having radial flanges 35 and 36, respectively, between which is arranged a pulley 37 driven by the belt 24. Preferably, friction elements are interposed between the flanges 35 and 36 and the respective faces of the pulley 37. A spring 38, embracing the end portion of shaft 30, bears at one end against the outer face of flange 36 and at its opposite end against a nut 39 having threaded engagement with the outer end portion of the shaft 30. By varying the tension of the spring 38 the force effective for driving the shaft 30 may be varied, the friction clutch constituted by the pulley 37 and the flanges 35 and 36 permitting slippage of the parts in response to overload.

The speed reduction mechanism 27 has the power delivery shaft 40 (Fig. 13) to which is fixed a gear 42 meshing with a gear 43 (Fig. 4). The gear 43 is mounted (preferably with interposed anti-friction bearings 44) on a main cam shaft 45 which turns in bearings 46 carried by the walls 6 and 7 of the box column. The gear 43 has an annular flange 47 on its outer face within which is mounted a clutch plate 48 fixed to the gear 43 and having radial slots 49 designed to receive the inner end of a sliding clutch dog 50 (Fig. 6). The dog 50 slides in a guideway in a clutch block 51 which is keyed to the outer end of the shaft 45. The dog 50 is urged inwardly for operative engagement with any one of the slots 49 by a spring 52 (Fig. 6) whose outer end bears against a retainer member 53 fixed to the block 51. A rod 54, attached at its inner end to the dog 50, extends axially of the spring 52 and through a bore in the retainer 53 and has an actuating knob 55 secured to its outer end. By pulling the knob 55 outwardly, the dog may be manually retracted to inoperative position in opposition to the spring 52. The knob 55 and the retainer 53 have cooperating elements (not shown), such as are commonly employed in clutch mechanisms, so that by turning the knob a part rotation (after the dog has been retracted) it will be held in its outer position, thus keeping the dog from returning to its operative position. The cam shaft may not be clutched to the driving gear 53 until the knob has again been manually actuated to release the clutch dog.

Normally, the position of the clutch dog is determined by a foot treadle 56 (Figs. 1, 2, 7 and 8) carried by one arm 57 of a bell crank lever mounted to turn on a stub shaft 58 fixed in a boss 59 projecting upwardly from the base plate 1. The bell crank also comprises an upwardly directed arm 60 having at its upper end a cam 61 designed to enter a slot in the end of clutch block 51 as the latter rotates with shaft 45 and to engage a bevel faced arm 62 (Fig. 6) on the dog 50 and thereby to retract the dog from operative position so as to release the cam shaft from the driving gear 43. A spring 63 (Figs. 1 and 7) connected to the arm 60 tends to swing the latter so as to cause cam 61 to retract the clutch dog at each rotation of the clutch block. By depression of the treadle 56 the arm 60 may be swung forwardly so as to disengage cam 61 from the arm 62 of the dog, thus permitting the dog 50 to engage one of the slots 49 and thus connect the cam shaft 45 to the drive gear 43. The dog 50 will remain in inoperative position until the treadle 56 is released, and thus, so long as the treadle 56 is held down, the machine will continue to operate. A latch 64 (Fig. 7) pivoted to the arm 60 and urged in the rearward direction by a spring 65, is designed to snap over a shoulder on the clutch block when the cam 61 engages and retracts the dog, thereby to prevent rebound of the parts as the clutch dog is disengaged.

To permit continuous operation of the machine without constantly applying pressure to the treadle 56, a locking treadle 66 (Figs. 1, 7 and 8) is provided. This locking treadle is carried by one arm 67 of a bell crank pivoted at 68 on the arm 57 of the treadle 56, this bell crank having a second arm 69 whose upper end, when moved forwardly, is designed to engage beneath a fixed abutment 70 carried by the machine frame. The arm 67 has a downwardly directed ear 71 (Fig. 8) designed to engage a stud 72 carried by the treadle arm 57. Thus when the locking treadle 66 is depressed, it swings the arm 57 downwardly, thus retracting cam 61 from the clutch dog and thus causing the cam shaft to be started. At the same time the arm 69 swings forwardly and beneath the abutment 70, thus retaining the treadles in this depressed position until, by further intentional actuation of treadle 66, the latter is permitted to be rocked by spring 73 so as to disengage its arm 69 from the abutment 70.

The cam shaft 45 (Fig. 4) carries two cams, the cam 74 (which actuates the picker, and the picker valve hereinafter described) being keyed to the shaft and located in the space between the frame members 6 and 7. The cam 75, which actuates the transfer carriage is keyed to the left-hand end of the shaft 45 at a point to the left of the frame member 6 (Fig. 2). Mounted on the inner side of the gear 43 (Fig. 4) is a sprocket wheel 76 about which extends a sprocket chain 76ª (Fig. 1) which actuates the gumming-applying mechanism hereinafter described.

Transfer carriage

At the forward left-hand part of the base 1 there are two spaced brackets 77 (Figs. 2 and 3) which support a fixed horizontal shaft 78 forming a pivotal support for the lower end of the upright, transfer carriage arm 79. At a point intermediate its ends, the arm 79 carries a stub shaft 80 (Fig. 3) on which turns a cam follower roll 81 which engages the groove 82 (Figs. 2, 3 and 4) in the cam 75. This cam groove is so designed as to provide two dwell portions at 83 and 84 (Fig. 2) respectively operative to cause the transfer carrier to pause at the label transfer station and at the label-affixing station, respectively. At its upper end the arm 79 is provided with a substantially horizontal portion 85, the upright portion of the arm 79 being of such length that the horizontal part 85 is free to swing from front to rear above the upper edge of the frame member 6. At its free or inner end the horizontal part 85 is shaped to constitute a support 86 for the label transfer carriage, the part 86 being located substantially midway between the planes of the members 6 and 7. The pivotal axis of the arm 79 is so located and the dimensions of the parts are such that the support 86 swings in a downwardly concave arc of large radius and through a path H (Fig. 57) such that the chord of this arc is inclined downwardly and to the rear.

Figure 40:
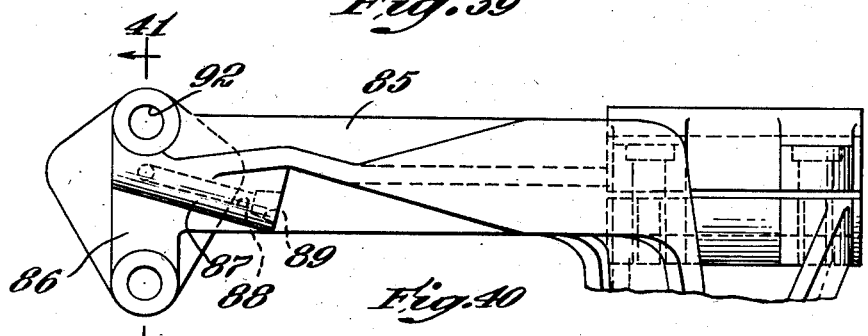
Fig. 40 is a fragmentary plan view of the free end portion of the label carriage supporting arm.
Figure 41:
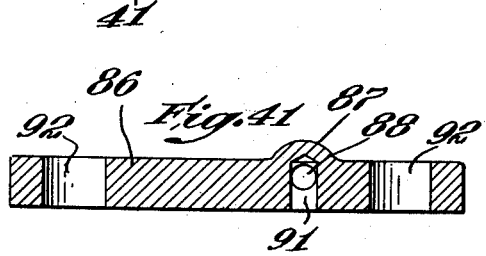
Fig. 41 is a section on the line 41—41 of Fig. 40.
Figure 42:
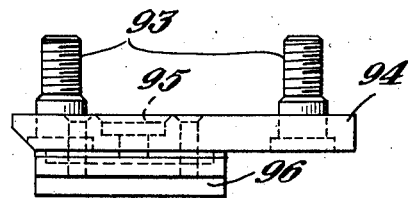
Fig. 42 is a side elevation of the label carriage.
Figure 44:
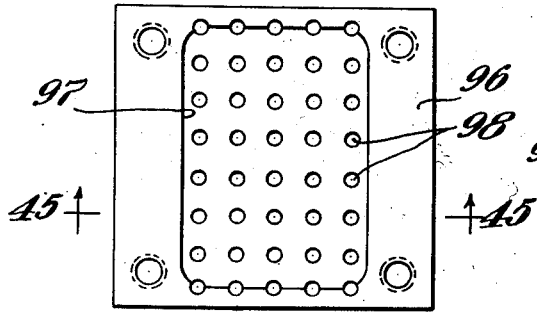
Fig. 44 is a plan view of the label carriage pad.
Figure 43:
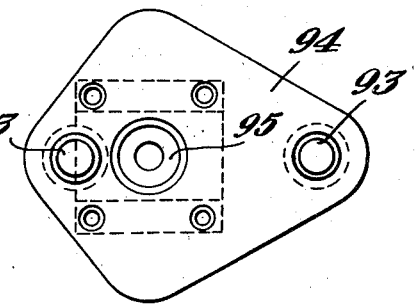
Fig. 43 is a plan view of the label carriage.
Figure 45:
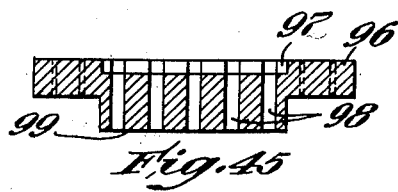
Fig. 45 is a section on the line 45—45 of Fig. 44.

The support 86 has a boss 87 (Fig. 40) at its upper side provided with an air passage 88, threaded at its outer end at 89, to receive a coupling for the attachment of one end of flexible air conduit 90 (Figs. 2 and 3). The opposite end of the air passage 88 communicates with a recess 91 open at the under side of the support 86. The support has openings 92 for the reception of screw-threaded studs 93 (Fig. 42) projecting up from the transfer carriage base plate 94, the studs receiving nuts to hold the parts in assembled relation. The plate 94 has therein a chamber 95 (Fig. 42) which registers with the recess 91 (Fig. 41) in the support, and is provided with apertures for the reception of studs which hold the transfer pad 96 (Fig. 44) in assembled relation with the support. The pad 96 (Fig. 44) is recessed at its upper side to provide a chamber 97 communicating with the recess 91 in the support, and from the chamber 97 a plurality of spaced, parallel suction passages 98 lead to the lower surface 99 of the pad.

Picker

A bracket 100 (Figs. 1, 15, 16 and 17) is secured to the frame member 7 and at its upper end has a bearing 101 (Fig. 17) for the tubular picker shaft 102 (Fig. 17), the latter being also provided with a rear bearing 103. At its forward end the shaft 102 has a picker carrying arm 104 and to the free end of this arm there is secured the picker 105 (Figs. 46 and 47). The arm 104 has a longitudinal passage 106 which communicates, by means of a suitable port, with the longitudinal bore 107 in the picker shaft 102. Picker 105 (Figs. 46 and 47) has a longitudinal passage 108 which communicates at one end with the passage 106 in arm 104, and at its other end with a plurality of sucker ports 109. The combined length of the arm 104 and the picker 105 is such that the group of sucker ports 109 (when the picker is horizontally disposed) is in the vertical plane of front-to-rear travel of the transfer carriage pad 96.

At the rear end of the picker shaft 102, a rock arm 110 (Figs. 15 and 16) is secured to the shaft. A yoke 111 is pivotally attached to the free end of the arm 110, the yoke being connected to a rod 112 which extends downwardly to the lower part of the machine at the outside of frame member 7, and has a yoke member 113 (Figs. 1, 37 and 38) secured to its lower end, this yoke member 113 being pivotally secured to the picker-actuating lever 114. At its forward end this lever 114 is pivotally supported on a shaft 116 carried by the frame members 6 and 7, the rear end portion 115 (Fig. 38) of the lever 114 being bent to extend to the outside of the frame member 7, the main part of the lever 114 being housed between the frame members 6 and 7. At a point between its ends the lever 114 carries a stud supporting a cam follower roll 117 (Figs. 37 and 38) which engages a cam groove 118 at the right-hand side of cam 74. The cam groove 118 is so contoured as to impart the proper motion to the picker in accurately timed relation to the movements of the other operative instrumentalities.

The picker shaft 102 (Figs. 15 and 17) projects rearwardly beyond the lever arm 110, and has a laterally projecting nipple portion 119 (Fig. 16) having a bore which communicates with the longitudinal passage 107 in the shaft 102, the nipple being designed to receive a coupling for the attachment of a flexible air conduit 120.

A valve rod 121 extends axially of the bore 107 in the picker shaft 102, the rod being of less diameter than the bore and passing through a packing bushing at 122 to prevent leakage along the rod. At its forward end the rod is provided with a valve for controlling a port which leads from the bore 107 in the shaft to the passage 106 in the picker arm 104.

Preferably, at a point convenient for actuation by the operator, the shaft 102 is provided with a radial port or passage P (Fig. 18) through its wall, the shaft being embraced at this point by a sleeve member 123 (Figs. 17 and 18) having a radial actuating handle 124 by means of which it may be turned relatively to the shaft 102. The sleeve 123 has a slot or opening which, when desired, may be registered with the port P in the wall of the shaft 102, so as to provide communication between the bore in the shaft and the outer atmosphere. Normally, however, the sleeve 123 closes this port P.

At its rear end the valve rod 121 is provided with an actuating disk 125 (Figs. 15 and 17) whose edge seats in a notch in the upper end of a rod 126 (Figs. 1, 11, 12 and 15) constituting one arm of a bell crank lever. The lower end of this rod 126 is clamped within a socket in the short rear arm 127 of a lever 128 fulcrumed on the righthand end of a shaft 129 fixed in aligned openings in rigid brackets 6ª and 7ª (Figs. 1 and 2) extending rearwardly from the frame members 6 and 7, respectively. The lever 128 is bent at the point 130 (Fig. 12) to provide a transverse portion 131 which extends inwardly through an opening 132 (Fig. 1) in the frame member 7, the inner end of this part 131 carrying a cam follower roll 133 (Figs. 11 and 12) which engages an appropriately contoured surface of the cam 74. A spring 134, connected at one end to lever 128 and at its other end to a pin 135 fixed to the frame, keeps the roll 133 in operative engagement with the cam 74.

Air pumps

A pump-supporting shelf or bracket 136 (Figs. 1, 22 and 23) is secured to the rear ends of the frame bracket members 6ª and 7ª, and on this shelf is mounted the air pump base 137. This base carries the casings 138 and 139 of two air pumps of any suitable type having the actuating shafts 140 and 141, respectively. On these shafts are mounted pulleys 142 and 143, respectively, which receive the drive belt 26 (Figs. 1 and 2) above referred to, which also passes around and is driven by the pulley 25 on the shaft 22 of the motor 16. In order to keep the belt 26 under proper tension, there is provided an idler pulley 145 (Figs. 22 and 23) which bears against one run of the belt 26 and which turns freely on a stud 146 (Fig. 23) at the end of one arm 147 of a bell crank lever fulcrumed at 148 (Fig. 22) on a stud projecting rearwardly from a boss 144 on the shelf 136, this bell crank lever having a second arm 149 to which is connected a tension spring 150 which constantly urges the pulley 145 against the belt, thus keeping the latter properly tensioned. The several pipes and conduits leading to and from the pumps will be hereinafter described.

Magazine

The bracket 100 (Fig. 15) which carries the bearings for the picker valve shaft 102, is provided with a socket 151 at the front of the machine for the reception of a vertically adjustable tubular post 152 (Figs. 19 and 20) which carries the label holder 153. This post is externally screw threaded for the reception of knurled adjusting and locking nuts 154 and 155, but is of such transverse section as to prevent it from turning in the socket. A bolt extends axially of the tubular post and has threaded engagement at its upper end with the elongate base plate 156 of the label holder. By loosening the bolt, the base plate may be oriented about the axis of the post.

The base plate 156 has two parallel elongate slots 156ˣ and 156ʸ (Fig. 19) for the reception of screw-threaded studs 157 and 157ª which enter threaded openings in independently adjustable slides 158 and 158ª which carry the opposite side walls 159 and 159ª, respectively, of the magazine. The base plate 156 also supports the elongate parallel bottom rails 156ª and 156ᵇ on which the lower edges of the labels rest, and which constitute guides for the label follower 160. Each of the side walls 159 and 159ª supports a pair of elongate side rails 161 and 162 (parallel to the bottom rails 156ª and 156ᵇ), the rails 161 and 162 being independently adjustable transversely of the magazine and forming guides for the vertical edges of the labels. At the delivery end of the magazine the rails 156ª and 156ᵇ are furnished with adjustable retainers screws 163. An adjustable post 164 carried by the side wall 159ª has a horizontal arm 165 overhanging the magazine and supporting an extension 165ª which is adjustable from front to rear, and which carries a pair of the vertically adjustable retainer screws 163. These several screws 163 are designed to be so adjusted as to permit the removal of the endmost label from the magazine while retaining the others. The part 165ª also supports a nozzle 166 (Fig. 19) which is connected by a conduit 167 (Figs. 1, 19, 22 and 23) to a valve housing 168 (Fig. 22) at the upper end of a pipe 169 leading from the delivery sides of both pumps so that at proper intervals a puff of air is delivered by the nozzle 166 against the edges of the forward labels in the magazine, thereby to separate labels which may be stuck together.

Article rest

The box column is provided with a forwardly directed bracket 170 (Figs. 2 and 3) which provides a rigid guide for a vertically movable article rest. The part 170 has parallel vertical faces 171, which are engaged by spaced parallel downwardly directed legs 172 of a carriage 173 (Figs. 48 and 49). This carriage is rigidly secured to the forward end of an arm 174 (Fig. 9) attached at its rear end to one arm 175 of a bell crank lever fulcrumed upon a shaft 176 whose opposite ends are fixed in aligned openings in bracket members 177 and 178 (Fig. 10) extending upwardly from the frame members 6 and 7, respectively. This bell crank lever has a second arm 179 extending downwardly and having a pad 180 at its lower end which bears against a rocker member 181 interposed between the pad and the upper end of a lever arm 182. An adjustable coiled compression spring 183 yieldingly urges the pad 180 toward the rocker 181.

The lever arm 182 is fixed to a hub 183 (Fig. 12) which turns on the shaft 129, a second arm 184 being fixed to the hub 183 and extending downwardly and carrying a cam follower roll 185 (Fig. 11) at its lower end which engages an appropriately contoured cam surface on the cam 74. The carriage 173 supports a spacer member 186 (Fig. 50) of which an assortment of different heights may be provided, thereby to accommodate articles of different dimensions. This spacer rests on the upper surface of the carriage and is removably secured thereto, preferably with provision for front-to-rear adjustment, by a threaded stud 186ᵃ (Fig. 9).

The upper surface of the spacer 186 is finished to constitute a support and guide for an article rest 187 which is adjustably secured to the spacer 186 by means of a screw. The article rest 187 has downwardly convergent elongate parallel rails 189 at its top which form a cradle recess for the reception of the article to be labeled. An assortment of these rests 187 having cradle recesses of different dimensions may be provided, thereby to accommodate articles of different shapes. Preferably the article rest 187 is furnished with a rearward extension 190 on which is mounted an adjustable stop 191 having a plurality of arms 192 of different lengths, any selected one of which may be so disposed as to constitute a rear abutment for an article resting in the cradle recess.

Label presser

Mounted to rock on the shaft 176 (Figs. 9 and 10) is a lever comprising the forwardly directed arm 193 and the rearwardly directed arm 194. The rear arm is provided with an elongate slot 195 (Fig. 9) which receives a pin 196 by means of which a bracket 197 is pivotally secured to the lever arm. A rod 198 is rigidly secured at its upper end to the bracket 197, and at its lower end (Figs. 11 and 12) this rod slides in a sleeve 199 secured to the upper end of a lever arm 200. A coiled spring 201 bears at its lower end against the sleeve 199 and at its upper end against a collar 202 fixed to rod 198. The spring tends to raise the rod 198 relatively to the sleeve 199 but permits rod 198 to yield downwardly.

The lever arm 200 has a hub portion 203 (Fig. 12) which receives a stud 204 projecting from a lever 205 having a hub 206 at its rear end which turns on shaft 129. At its forward end the lever 205 has a cam follower roll 207 which engages an appropriately contoured surface of cam 74.

A second rod 208 (Fig. 10) is attached at its upper end to a lateral ear 209 projecting from bracket 197. This rod 208 is connected by a turnbuckle 210 to a rod 211 (Figs. 2, 9 and 10) connected, preferably by a ball and socket connection, to a treadle lever 212 fulcrumed on a stud 213 projecting from frame part 6. This treadle lever projects to the front of the machine and has a foot treadle 214 at its forward end. A spring 215 tends to elevate the forward end of the treadle lever.

The lever arm 193 (Figs. 2 and 9) is of gooseneck shape, being so curved that its forward end is directed downwardly and is located directly above the article rest. The forward end of the arm 193 is provided with a bracket portion 216 having a finished lower surface to which is attached a label presser and wiping device 217 (Fig. 54). This wiping device comprises a frame having a base portion 218 designed to be bolted to the under surface of bracket 216, and having downwardly directed right and left pairs of parallel legs 219 provided at their lower ends with bearing openings which receive pivot pins 220ᵃ by means of which a wiper wing 220 (Figs. 54 and 55) is attached to each pair of legs.

Each wiper wing 220 (Fig. 55) comprises a hinge portion 221 which is interposed between the legs 219 of one of said pairs and pivotally attached thereto by the pivot pin 220ᵃ. Each wing also comprises two upstanding arms 222, the corresponding arms of the opposite wings being connected by a tension spring 223 (Fig. 54). Each wing also has a lateral ear 224 designed for engagement with a screw carried by a lug 225 carried by the base 218 thereby to limit movement of the wing about its pivotal axis. Each wing also has a portion 226 (Fig. 55) (here shown as downwardly concave, although it may be otherwise contoured appropriately to cooperate with articles of various shapes), said portions 226 collectively forming an abutment for a yielding pad 227 (Fig. 54) of sponge rubber, felt or the like. To facilitate retention of the pad, each wing is preferably furnished with a flange 228 extending along the lower edge of the wing, this flange preferably being removable thereby to facilitate insertion of the pad.

Gumming mechanism

Figure 32:
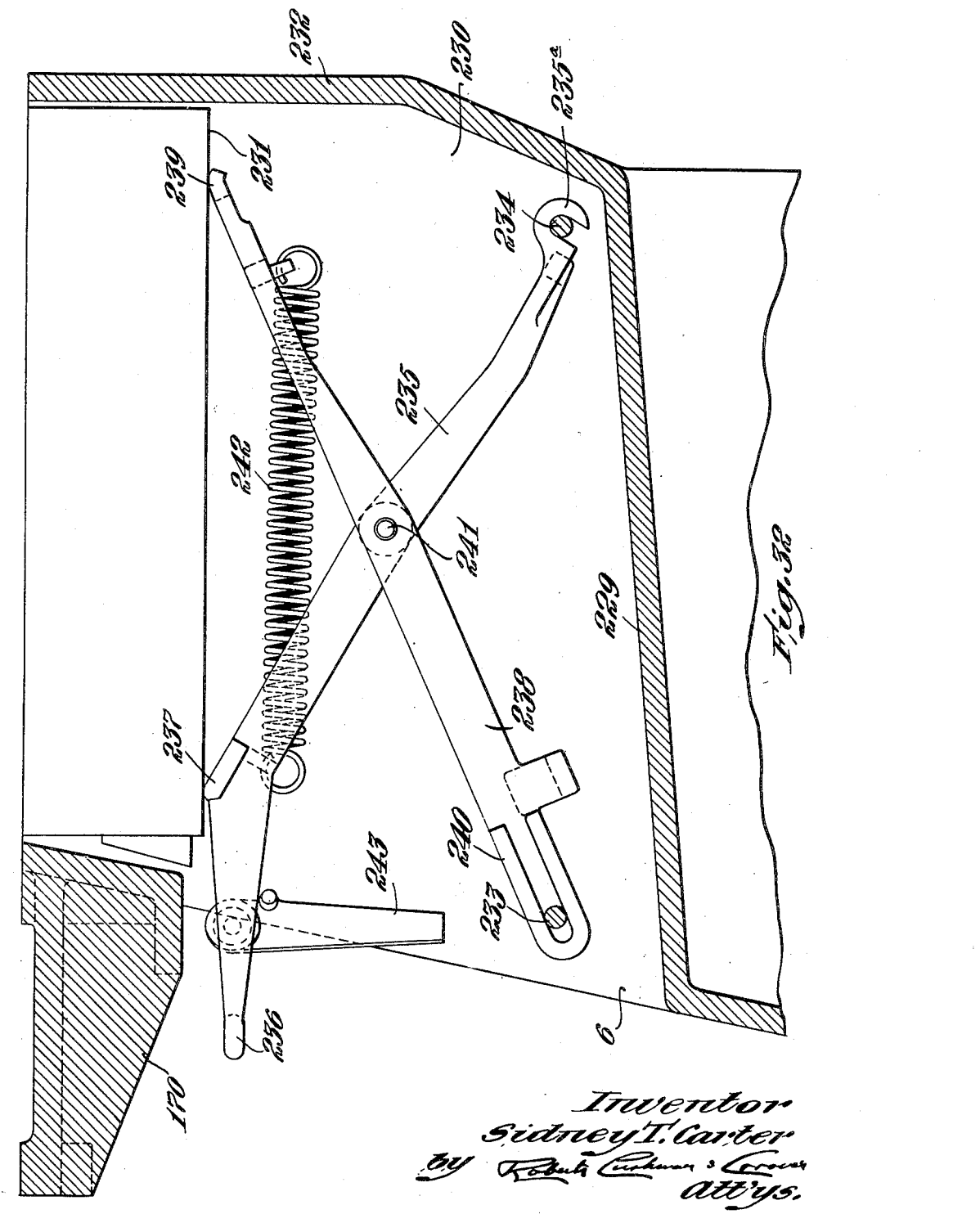
Fig. 32 is a fragmentary vertical section through the machine frame showing details of the gum box support.
Figure 33:
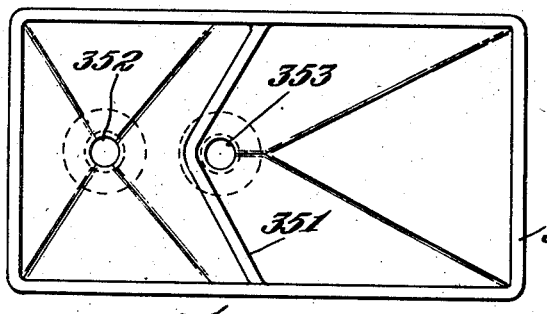
Fig. 33 is a plan view of the roll washing box.
Figure 35:
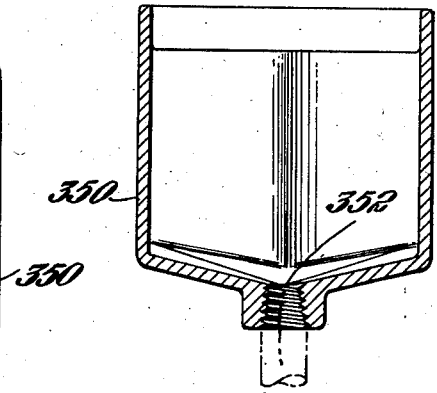
Fig. 35 is a section on the line 35—35 of Fig. 34.
Figure 34:
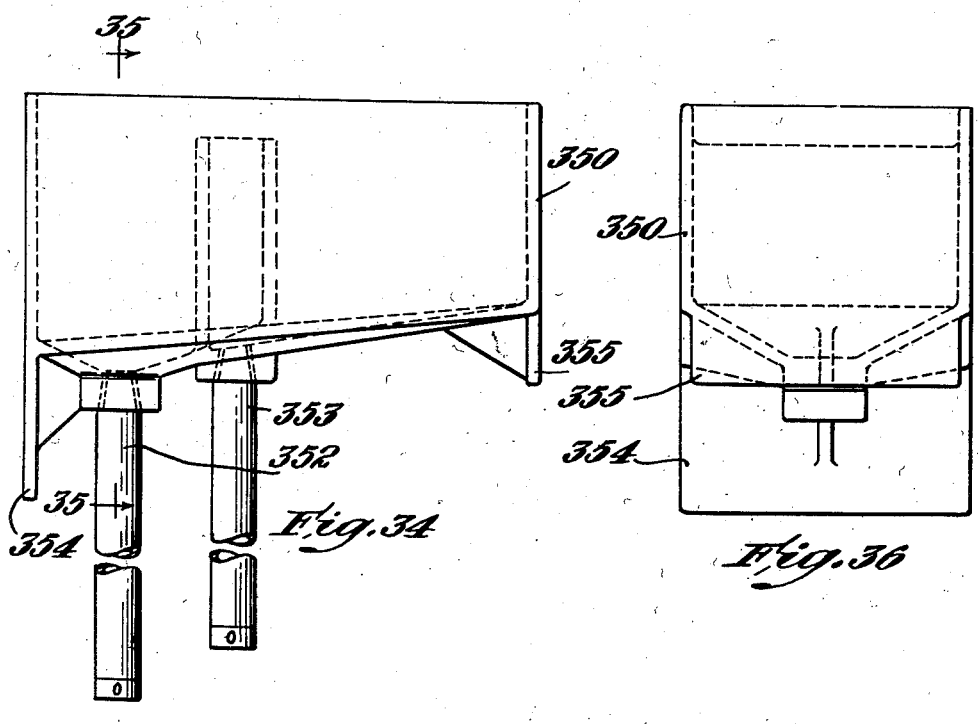
Fig. 34 is a left-hand side elevation of the box of Fig. 33.
Figure 36:
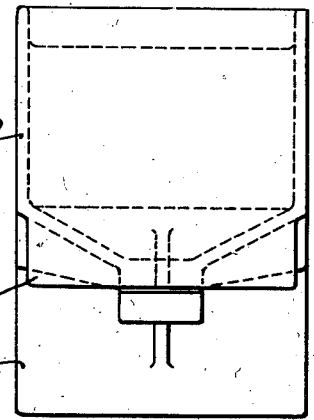
Fig. 36 is an end elevation of the washing box.
Figure 39:
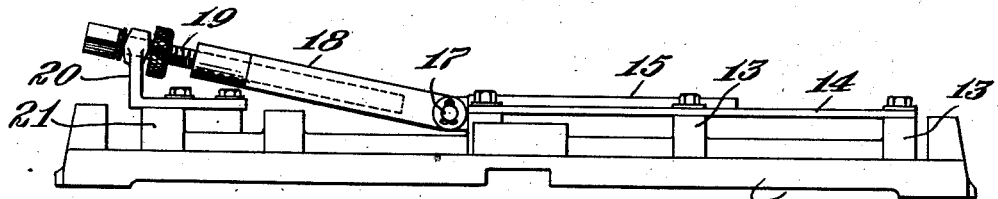
Fig. 39 is a rear elevation of the base of the machine showing the guides and adjusting means for the drive motor.

The box column has a web 229 which preferably slopes forwardly to a slight degree and which constitutes the floor of a chamber 230 (Fig. 32) for the reception of the gum box 231, the walls 6 and 7 of the column forming the sides of this chamber which is closed at its rear by a web 232 and which is open at its front and at its top.

Studs 233 (Fig. 32) project inwardly from opposite side walls of chamber 230 at its lower forward part. A shaft 234 extends across the chamber at its lower rear part. A U-shaped frame, having parallel legs 235, is arranged within the chamber 230, the rear ends of the legs 235 having hook portions 235ᵃ which detachably engage and pivot on the shaft 234. The transverse member 236 of this U-shaped frame is located outside of the chamber at the front of the machine, being disposed below the bracket 170 and constitutes a handle by means of which the forward portion of the frame may be depressed. The frame also has a transversely extending web portion 237 which constitutes one of the supports for the gum box 231.

Figures 30, 31:
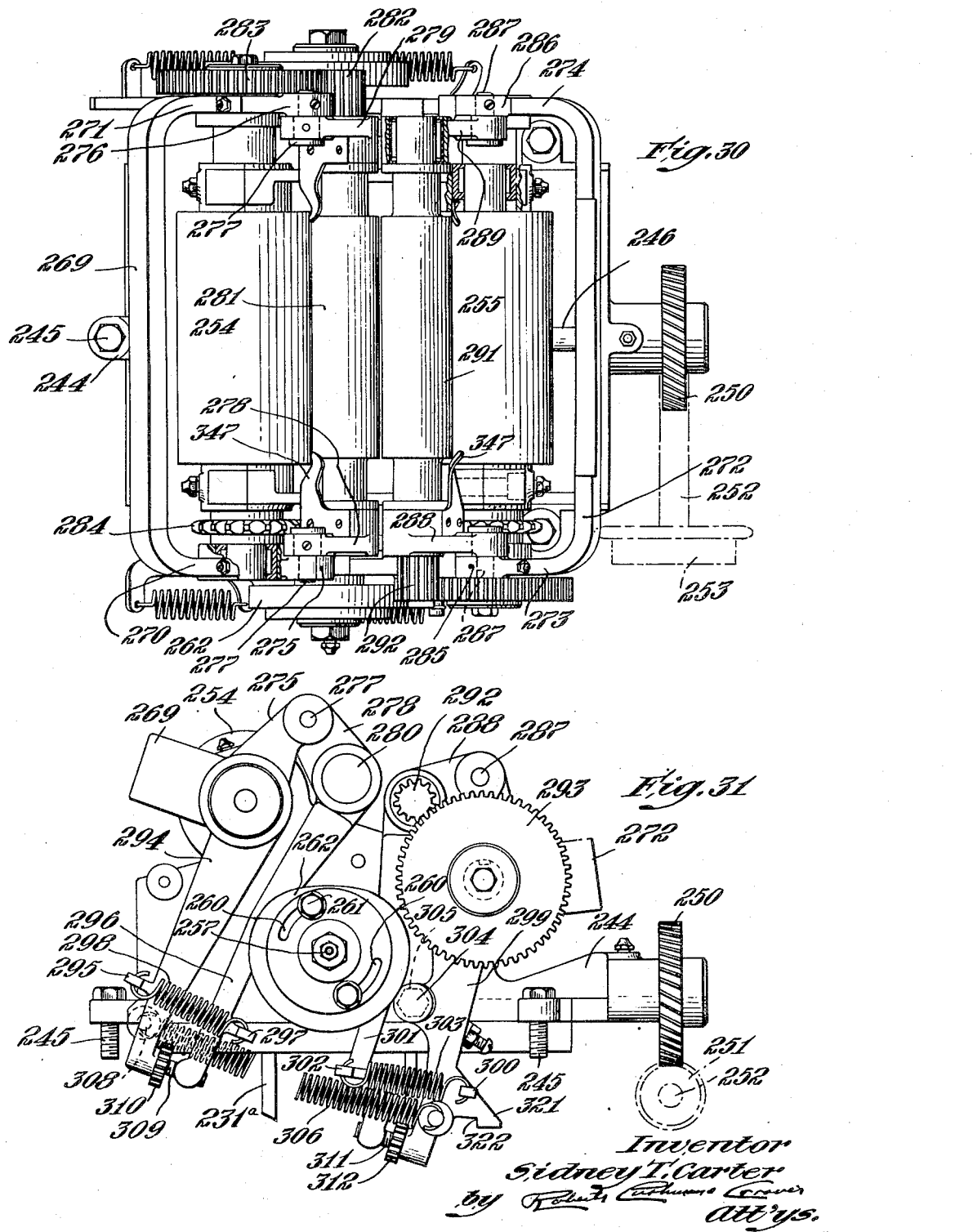
Fig. 30 is a plan view of the gumming unit.
Fig. 31 is a right-hand side elevation of the parts shown in Fig. 30.

A second U-shaped frame, comprising parallel legs 238 and a transverse part 239 (the latter constituting the other support for the box), is disposed within the chamber 230, the width of this second frame being such that it may nest between the legs of the first frame, the legs 238 being provided with U-shaped bosses at their outer sides which form elongate slots 240 which receive the studs 233. Pivot pins 241 connect adjacent legs 235 and 238 of the respective frames. A coiled tension spring 242 connects the frames and tends to hold the box supports 237 and 239 in elevated operative position, the upward movement of the box being limited by contact with the frame 244 of the gum-applying means, about to be described, the pan being guided in its upward movement by fixed parts 231ᵃ (Fig. 31). A supporting leg 243 is pivotally attached at its upper end to the forward part of one of the legs 235. By depressing the part 236, the pad supports 237 and 239 may be lowered, and when the points of connection of the spring 242 to the frames pass below the axes of pivot pins 241, the spring action is thereby reversed so as to tend further to depress the parts 237 and 239, the leg 243 being swung forwardly so as to permit the supports to move down to their lowermost position. In this latter position of the supports 237 and 239, the box 231 may readily be withdrawn forwardly from the chamber for cleaning or refilling, the upper edge of the box, when in the lowered position, clearing the gum-applying means above referred to.

Figure 28:
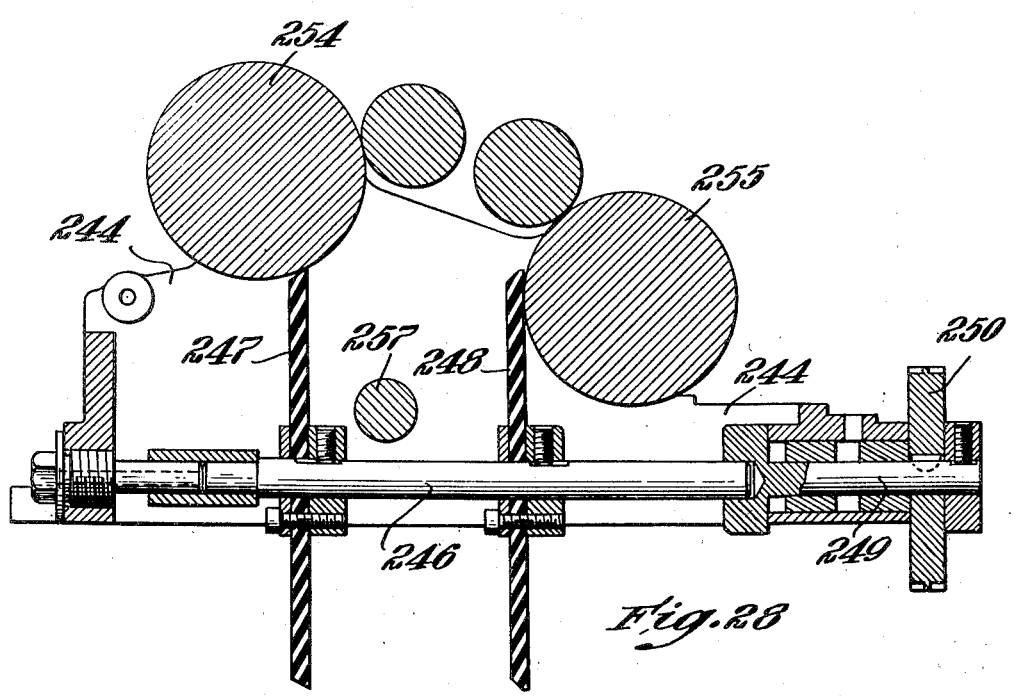
Fig. 28 is a longitudinal vertical section through the gum-applying unit.

An open frame 244 (Figs. 30 and 31), for example a casting, is secured by bolts 245 to the upper part of the main frame and in registry with the open top of gum box chamber 230. This frame has bearings for a shaft 246 (Fig. 28) on which is fixed a pair of axially spaced disks 247 and 248 whose outer portions, at least, are preferably of rubber or other material, desirably flexible, which does not readily absorb the gum. The rear end 249 of the shaft 246 projects outside of the frame 244 and has fixed to its outer end a spiral gear 250 (Figs. 27-31) which meshes with a spiral gear 251 (Fig. 27) on a transverse shaft 252 journaled in a bearing carried by frame member 7 and having a sprocket wheel 253 (Fig. 27) attached to its outer end.

The upper peripheral edge of disk 247 normally contacts the peripheral surface of a spreader roll 254, while the rear face of disk 248 normally contacts the peripheral surface of a spreader roll 255, the axes of the rolls 254 and 255 being parallel and spaced apart.

The frame 244 is also provided with bearings 256 for a shaft 257 (Fig. 29) which is at right angles to the shaft 246 and which extends out beyond the frame 244 at the right and left sides, respectively, of the latter. Flanged sleeves 258 and 259 (Figs. 29 and 31) respectively, are secured to the opposite ends of the shaft 257, the flange portions of these sleeves having arcuate slots 260 which receive bolts 261 by means of which cams 262 and 263 are secured to the respective disks with capability of angular adjustment about the axis of the shaft 257. A sprocket 264 (Figs. 29 and 56ª) is fixed to shaft 257.

The frame 244 also has bearings for the shafts of the parallel, front and rear gum-spreading rolls 254 and 255 respectively. Each of the roll shafts is substantially longer than the roll which it supports (the roll being wholly inside the frame 244) and the end portions of the shaft of the spreader roll 254 form supports for a rigid U-shaped rocking frame (Fig. 30) comprising a transverse front bar 269, and right and left substantially parallel legs 270 and 271, respectively, having aligned bearing openings for the reception of the end portions of the shaft of roll 254.

The end portions of the shaft of the rear spreader roll 255 also constitute supports for a rigid U-shaped rocking frame comprising the transverse rail 272 and right and left parallel legs 273 and 274, these legs having aligned bearing openings for the ends of the shaft of the roll 255.

Rigid bracket arms 275 and 276 (Fig. 31) project upwardly from the rear ends of the arms 270 and 271, respectively, and carry pivot pins 277 constituting fulcrums for right and left L-shaped rockers 278 and 279 having aligned bearings at their angles for the reception of the opposite ends respectively of the shaft 280 (Fig. 31) of a gum-applying roll 281. At its left-hand end the shaft 280 is provided with a pinion 282 which meshes with a gear 283 fixed to the left-hand end of the shaft of roll 254. A sprocket wheel 284 is fixed to the opposite end of the shaft of the roll 254.

The arms 273 and 274 of the rear rocking frame are likewise provided with upwardly directed right and left rigid brackets 285 and 286, respectively (Fig. 30), which carry pivot pins 287 providing fulcrums for a pair of L-shaped rockers 288 and 289 respectively, having bearings at their angles for the reception of the opposite ends respectively of a shaft carrying a rear applicator roll 291. At its right-hand end the shaft 290 is provided with a pinion 292 which meshes with a gear 293 fixed to the right-hand end of the shaft of the rear roll 255.

Each leg 270 and 271 of the front rocker frame is provided with an elongate, downwardly directed rigid arm 294 (Fig. 31) provided at its lower end with a lug 295. Each of the L-shaped rockers 278 also comprises a long downwardly directed arm 296, generally parallel to the arm 294, and having a lug 297 near its lower end. A tension spring 298 connects the lugs 295 and 297, thus drawing the lower ends of arms 294 and 296 toward each other and in this way urging the applicator roll 281 toward the spreader roll 254.

Each of the legs 273 and 274 of the rear rocker frame is likewise provided with a downwardly directed arm 299 having a lug 300 near its lower end. Each of the rear L-shaped rockers 288 and 289 also comprises an elongate downwardly directed arm 301 which is generally parallel to the adjacent arm 299 and which is provided with a lug 302. The lugs 300 and 302 are connected by a tension spring 303 which acts to urge the rear applicator roll 291 toward the spreader roll 255.

The arm 299 of the rear rocker frame is provided with a stud 304 on which is mounted a cam follower roll 305 which engages the cam 262 on the right-hand end of the shaft 257. A tension spring 306 is connected at one end to a pin projecting from the lower part of the arm 299, the opposite end of the spring being fastened to a pin fixed to the bracket 100. The spring 306 thus functions to hold the cam follower roll 305 in contact with cam 262.

At the left-hand side of the machine the arm 294 of the front rocker frame is provided with a cam follower roll (not shown) which engages the cam 263 at the left-hand end of shaft 257 and a tension spring, attached at one end to the arm 294 by means of a pin 308 and at its opposite end to a fixed part of the frame, holds this latter roll in contact with cam 263.

The arm 294 at each side of the machine, is provided with an unthreaded bore near its lower end which freely receives the threaded forward end portion of a shaft 309 (Fig. 31) on which is mounted an internally screw-threaded spur gear 310. The rear end of the shaft 309 is flattened vertically and is received in a slot in the lower end of the arm 296 so that the shaft 309 cannot rotate. The gear 310 constitutes an adjustable abutment engaging the rear face of the lower end of the arm 294, against which it is held by the spring 298. By turning the gear 310, the distance between the lower ends of arms 294 and 296 may be varied, thereby adjusting the distance between the peripheral surfaces of rolls 254 and 281. Since the arms 296 and 294 are much longer than the bracket arm 275 and the upper arm of the rocker 278, and since the threads on screw 309 may be of fine pitch, a very accurate micrometer type adjustment of the distance between the surfaces of the rolls is thus possible. Moreover, as the adjustments at opposite sides of the machine are independent, the rolls may thus be so adjusted as to in. ire uniformity of spacing of their peripheral surfaces from end to end.

The lower ends of the arms 301 and 299 at opposite sides of the machine are also relatively adjustable by screw shafts 311 and an internally screw-threaded spur gear 312, so that the rolls 255 and 291 may likewise be accurately adjusted relatively to each other.

In order conveniently to turn the gears 310 and 312 at opposite sides of the machine, brackets 313 (Fig. 56) are attached to the outer surfaces of the box column, each bracket having an integral bearing portion in which a shaft 314 turns. This shaft is provided at its rear end with an elongate spur pinion 315 which always meshes with gear 312, and is provided at its forward end, within convenient reach of the operator, with a knurled knob 316 whereby the shaft may be turned. Forwardly of the bearing in which the shaft 314 turns, there is arranged a sleeve 317 which is telescoped over the forward part of the shaft 314 and which carries an elongate spur pinion 318 which always meshes with the gear 310. A knurled knob 319 affords ready means for turning the sleeve 317. Thus by manipulation of the knobs 316 and 319 at opposite sides of the machine, the rolls of the front and rear pairs may be most accurately adjusted relatively to each other so as thereby to insure a uniform coating of gum on the applicator rolls and a coating which may be varied in thickness as desired. Preferably spring detents 320 (Fig. 56) are arranged to engage the teeth of the pinions 315 and 318 to prevent accidental disturbance of the setting of the rolls.

As above described, the label transfer carriage is mounted on the upper end of a long lever arm 79 which swings about a fulcrum at the lower part of the machine. While this arrangement insures a very smooth, vibrationless movement of the transfer carriage, it causes the carriage to move in a downwardly concave arcuate path. Thus since, in accordance with the present invention, it is desired to apply the gum to the opposite end portions of the label during the backward and forward motions respectively of the carriage (a method which is disclosed in the patent to Sjoberg et al., No. 2,292,093, August 4, 1942) and to move each of a pair of applicator rolls successively into operative engagement with a lebal mounted on the carrier (a method described in the patent to Holm No. 2,257,055, September 23, 1941) it is necessary so to modify the bodily movement of the applicator rolls as to compensate for the curved path of the carriage, thereby to insure that throughout the duration of the contact of the applicator roll with the label, the roll will apply substantial uniform pressure to the label. This is accomplished by the provision of the cams 262 and 263 above described, each cam being so contoured as, by engagement with the corresponding roll 305, to swing the front or rear rocking frame and thereby to raise and lower the applicator rolls 281 and 291 in properly timed relation and to the proper extent to insure uniform application of gum to the label as the label moves with the transfer carriage in this curved path.

Safety appliance

Figure 1:
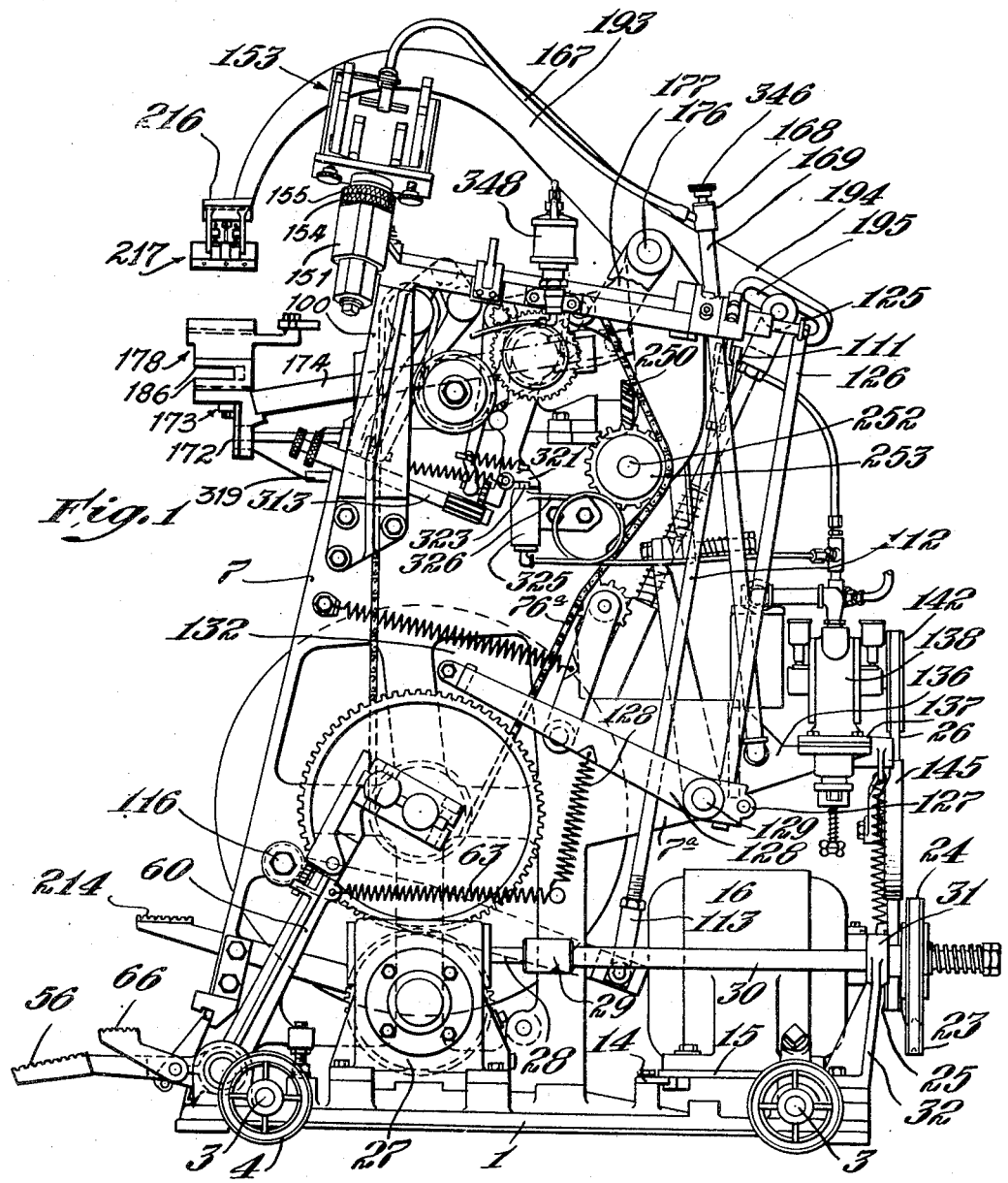

In machines of this type it is essential to prevent the application of gum to the transfer carriage if, for example, by reason of depletion of the label supply or failure of the picker properly to function, the carriage is unprovided with a label as it passes through the gum-applying zone. To this end the lower part of the arm 299 (Figs. 1 and 31) at the right-hand side of the machine is furnished with a rearwardly directed latch bracket 321 having a notch 322 at its under side which is arranged to be engaged at times by a vertically movable latch dog 323 (Figs. 1 and 25). This latch dog is mounted on the upper end of a piston 324 which slides in a cylinder 325 mounted on a bracket 326 which is adjustably secured to the frame member 7. A spring urges the piston upwardly thereby to engage the dog 323 with the notch 322 (if the latter be registered with the dog). The lower end of the cylinder 325 is closed by a cap having a threaded opening for the reception of the end of a conduit 328 which leads to one of the air pumps as hereinafter described.

At the opposite or left-hand side of the machine there is provided a bracket 329 (Fig. 26) similar to the bracket 326, mounted on the frame part 6 and carrying a cylinder 330 similar to the cylinder 325 within which is mounted a spring-pressed piston 331 carrying a locking dog 331ᵃ similar to the dog 323. Preferably a stop 332, secured to the bracket, limits upward movement of the dog. A conduit 333 connects the cylinder 330 to one of the air pumps as hereafter described. This bracket on the left-hand side of the machine has an upstanding ear 334 (Fig. 26) having therein a guide bore for the rear end portion of a stop rod 335 whose forward end is pivotally attached to the lower part of the left-hand arm 294 of the front rocking frame.

As above described, the machine is provided with a pair of constantly operating vacuum pumps 138 and 139. The pump 138 has an intake or vacuum line 120 (Figs. 15, 16 and 22) leading from the nipple 119 at the end of the hollow picker shaft 102. The pump 139 has an intake or vacuum connection 336 to which the rear ends of the conduits 328 and 333 (Figs. 25 and 26) are connected. From the connection 336 another conduit 337 leads to the label carriage control-valve housing 338 (Fig. 24) which is mounted on the outside of frame part 6 (Fig. 2). Within this housing 338 there is arranged a piston valve 339 connected, by a flexible coupling 340, to the upper end of a valve rod 341 (Figs. 2, 24, 37 and 38) whose lower end is pivotally connected to a lever 342 fulcrumed on the shaft 116 and having a cam follower roll 343 which engages an appropriately contoured cam groove in the face of the cam 75. The valve 339 controls a port between the conduit 337 and the flexible conduit 90 (Figs. 2 and 3) which leads from the transfer carriage suction pad, this conduit 90 being attached to the transfer carriage arm 79 at a convenient point intermediate its ends by means of a clip 344 (Fig. 3).

The delivery or pressure sides of the two pumps are connected to a pipe 345 having, if desired, an oil separator 345ᵃ connected thereto and which is connected to the substantially vertical conduit 169 which leads to a fitting 168 from which a flexible conduit 167 leads to the label-separating nozzle 166. A needle valve located near the lower end of conduit 169 and adjustable by a thumbscrew 346 (Figs. 1 and 22) determines how much of the air delivered by the pumps shall pass through pipe 167 to the nozzle for separating the labels in the magazine and how much of the air delivered by the pumps shall be exhausted directly to the atmosphere through a port controlled by the valve.

In order to keep the gum on the rollers 254 and 255 from escaping at the ends of the rollers, scraper devices 347 (Fig. 30) are fixed to the bearings of the roll shafts or other convenient support, these scrapers being so contoured as to cause any gum which tends to accumulate at the end of the roll to be scraped back so as to run down into the gum box. Since some of the gums employed tend to become too viscous during the operation of the machine, by reason of evaporation of the solvent employed, it is preferred to provide a reservoir 348 (Figs. 1 and 15) for solvent or diluent for instance water, the reservoir being mounted at a convenient point at the upper part of the machine and having a delivery conduit 349 leading to the gum box with appropriate valve means (not shown) to control the rate of delivery.

At the end of the day's work it is necessary to wash the gum-applying means. Preparatory to this washing operation the operator lowers the gum box supports to their lowermost positions, and then preferably places a water-collecting pan, not shown, on top of the gum box, the pan being of any suitable construction, but preferably being of substantially the same superficial area as the box so as to rest securely on the upper edge of the box and to prevent water from running down into the gum box so as to dilute the adhesive. The gum box supports are then raised, thus disposing the water-collecting pan immediately below the gum-applying means, but the gum box supports are not lifted at this time high enough to cause the points of connection of the spring 242 to rise above the pivot pins 241. Thus the spring still tends to lower the gum box. To support the water pan at the proper point, the leg 243 is swung rearwardly so that its lower end rests upon the floor 229 of the chamber 230. The leg 243 is of such length that, when the parts are thus disposed, the upper edge of the water pan will not interfere with any of the parts of the gum-applying apparatus. By using a separate water-collecting receptacle, the water or other cleansing fluid is kept out of the gum box so that the contents of the latter are not diluted. When it is desired to remove the elevating mechanism from the chamber 230 for cleaning, the hook members 235a are released from the shaft 234 and the entire elevating mechanism is then drawn forwardly, the studs 233 escaping from the open rear ends of the slots in the U-shaped bosses 240. To facilitate this washing operation, a water pan 350 (Figs. 33-36) may be provided. Preferably this pan is divided by a septum 351 to provide chambers of substantially equal capacity and from each of these chambers leads a pipe 352 and 353, respectively, designed to deliver the fluid onto the rolls of the pairs respectively, the lower ends of these pipes preferably being provided with small delivery orifices to spread the water lengthwise of the rolls. To facilitate this use of the pan it is preferably furnished with legs 354 and 355 so shaped as to seat upon an appropriate part of the frame and support the water pan in proper position during the washing operation.

After having arranged the receptacle 350 in operative position, it is filled with water, preferably hot, and this water passes down through the pipes 252 and 253, and after flowing over the rolls, drips down into the water-receiving pan resting on the top of the gum box as above described.

Preferably a switch S² for controlling the motor is mounted on the machine frame at a convenient point within reach of the operator.

Figure 59:
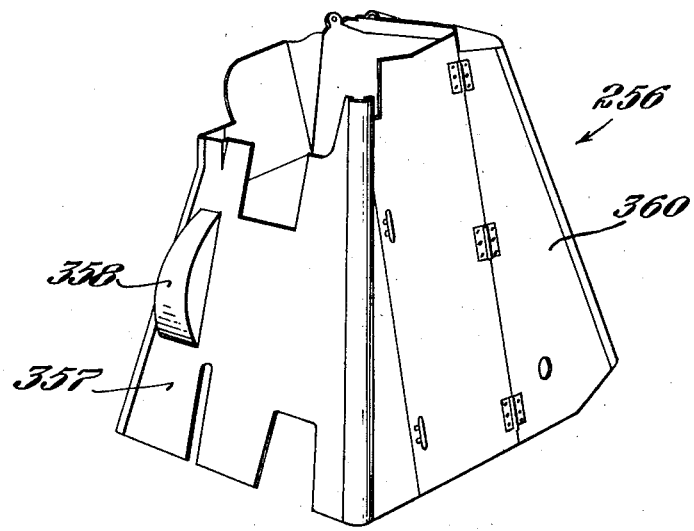
Fig. 59 is a perspective front elevation showing a casing for housing the mechanism.
Figure 60:
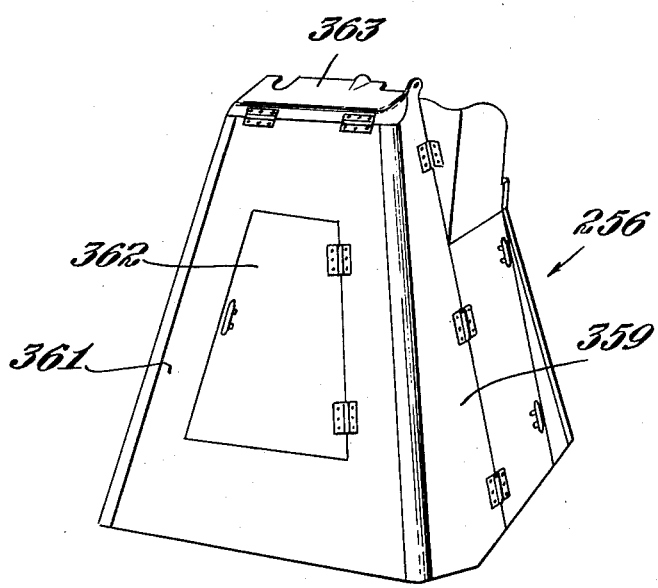
Fig. 60 is a perspective rear elevation of the casing.

Preferably in order to protect the machine parts from dirt and dust a casing or housing is provided. As shown, this casing 356 (Fig. 59) which may be sheet metal or other suitable material is of generally frusto-pyramidal form, comprising four upwardly sloping walls. The front wall 357 has appropriate apertures in its lower part for the accommodation of the treadles 56, 66 and 214 and with a hollow boss 358 to receive the forward part of the cam 75. The left and right-hand walls 359 and 360 have doors to provide easy access to the parts which may need adjustment and the rear wall 361 likewise has a door 362.

There is a hinged cover 363 which normally overhangs the mechanism of the rear upper part of the machine. The lower edge of the casing or housing rests upon the marginal portion of the base 1 and may be attached to the latter by any appropriate means, for example screws or bolts.

Referring to Figs. 57 and 58, the letter H designates the path along which the transfer carriage 96 moves back and forth from the labeling station L past a transfer station T and a gumming station G to a point of reversal E and then forwardly again past the gumming station and the transfer station to the labeling station. At the labeling station is the support 187 for the article B to which the label is to be applied and also the presser device 217 which presses the gummed label against the surface of the article B after the carriage has deposited the label on the article and has started rearwardly along the path H. At the transfer station T the picker 105 functions to present a label to the under surface of the carrier 99 as the latter moves rearwardly through the transfer station. The carriage-actuating cam has a dwell so designed that the carriage hesitates momentarily at the transfer station to permit transfer of the label to take place. The picker 105 approaches the magazine 153 (from which it picks up a label) and then moves down to the transfer station in readiness to deliver the label to the carrier.

The gum-applying means at the gumming station G comprises the front and rear applicator rolls 281 and 291 respectively, which are moved up and down by the cams 263 as above described. As the carrier moves rearwardly, as shown in Fig. 57, the roll 281 is moved upwardly and into contact with the label on the moving carrier, first contacting the surface of the label substantially midway the length of the label and being maintained in contact with the label by the cam 263 as the carriage continues to move along its curved path H until gum has been applied to the entire forward or trailing part of the label. The carriage continues on to the point of reversal E and then starts forward, as shown in Fig. 58, the transfer roll 281 now being in its lowered, inoperative position while the roll 291 is raised so as first to contact the label at about its mid-point and to remain in contact with the trailing portion of the label until the entire rear part of the label has been gummed. This motion is controlled by cam 262. The carriage now continues on past the transfer station T without hesitating at this point, the picker 105 at this time having been moved toward the magazine in readiness to pick off another label. The carriage thus continues past the transfer point to the labeling station L where it dwells for a short time while the article support 187 moves upwardly so as to bring the article into contact with the gummed surface of the label on the carrier. The carrier now starts back along the path H while the label-wiping and pressing device 217 moves downwardly to press the label firmly against the article B on the support 187.

As above noted, the front and rear rockers which support the transfer rolls 281 and 291 are urged by springs in a direction such as to move the applicator rolls toward operative position, the rocker frames being moved downwardly to an inoperative position by the cams 262 and 263. With this arrangement it is readily possible to prevent movement of the applicator rolls to the operative position merely by blocking the normal movement of the rocker frames. Thus, for example, if the carriage approach the gumming position without having been provided with a label, air is able freely to enter the conduit 90 and thus to break the vacuum at the connections 333 and 337 (Fig. 22). This permits the springs in the cylinders 325 and 330 to elevate the dogs so that they engage the stop elements 321 and 335, thus preventing the rocker frames from rocking to the extent normally permitted by the cams 262 and 263 and thereby preventing the applicator rolls from applying gum to the surface of the carriage itself.

It is to be understood that in the normal operation of the machine, the air valves for the picker and carriage are automatically operated by the cam means above described so that the picker first receives a label from the magazine and moves it down to the transfer position and while the carriage dwells in the transfer position, the suction at the picker is broken while suction is created at the carriage, thus causing the carriage to remove the label from the picker. Likewise when the carriage has moved to the labeling position and has contacted the gummed label with the article, the suction at the carriage is released thus permitting the carriage to start its return trip empty.

By the provision of the clutch drive of the machine it is possible for the operator to cause the machine to perform one cycle of operations and then stop, thus enabling a slow operator or a novice to perform the operation as slowly as desired. On the other hand, by depression of the locking lever 66, the normal operation of the clutch may be discontinued so that the machine will continue to operate cycle after cycle until lever 56 is released.

I claim:

1. A label-affixing machine wherein a label carrier moves from a transfer station past a gumming station and then, after reversing its direction, again passes the gumming station and the transfer station, and stops at the labeling station, means defining the path of movement of the carrier comprising a lever arm fulcrumed at its lower end and to whose upper end the carrier is fixed, and cam means for swinging the lever arm.

2. A label-affixing machine wherein a label carrier moves from a transfer station past a gumming station and then, after reversing its direction, again passes the gumming station and the transfer station, and stops at the labeling station, gumming means at the gumming station, an article support at the labeling station, and means defining a downwardly concave arcuate path for the carriage, one end of said path being at the labeling station, the gumming means being operatively disposed intermediate the ends of said path.

3. A label-affixing machine wherein a label carrier moves from a transfer station past a gumming station and then, after reversing its direction, again passes the gumming station and the transfer station, and stops at the labeling station, gumming means at the gumming station, an article support at the labeling station, a long lever arm, fulcrumed at its lower end at a point substantially beneath the labeling station, said lever supporting the carriage at its upper end and defining a path for the carriage which is downwardly concave with its forward end at the labeling station, and cam means for rocking the lever.

4. In a machine of the class described wherein a label carriage moves back and forth from front to rear in a predetermined path and dwells during its travel at a transfer station, a magazine for labels located laterally of said path, and a pneumatic picker operative to take a label from the magazine and to deliver it to the carriage at the transfer station, a tubular shaft having its axis disposed parallel to the vertical plane of the carriage path, an arm fixed at one end to said tubular shaft and to whose other end the picker is attached, the length of said arm being such that when in delivery position the picker is registered with the carriage at the transfer station, the arm having a passage leading from the picker to the interior of the tubular shaft, a valve controlling said passage, means for creating suction within the tubular shaft, a valve-actuating rod within said shaft, and means operative, in timed relation to the carriage movements, for rocking the tubular shaft and for actuating the valve rod.

5. In a machine of the class described wherein a label carriage receives a label from a picker and delivers it to an affixing station, a presser at the affixing station and an article rest for supporting an article at the affixing station, a rigid guide having parallel faces, a carriage for the article rest provided with spaced legs which engage said faces of the guide thereby to guide the article rest carriage in a predetermined path in its movement toward and from the presser, a bell crank lever, one arm of which is connected to said article rest carriage, a rotary cam, a second bell crank lever comprising an arm having a cam follower engaging said cam, the other arms of said bell crank levers being substantially parallel and adjacent to each other, and spring means yieldably urging said latter arms toward each other.

6. In combination, in a power-driven label-affixing apparatus of the kind in which the article to be labeled is mounted on a support and the label is pressed against the article by a presser device movable toward and from the support, and wherein, when the machine stops, the presser is positioned to clamp the article against the support, a lever element, operative at will while the machine is stopped, to retract the presser from the support thereby to free the article for removal.

7. In a power-driven label-affixing apparatus of the kind in which the article to be labeled is mounted on a support, and the label is pressed against the article by a presser device movable toward and from the support, and wherein, when the machine stops, the presser is positioned to clamp the article against the support, characterized in that there is interposed between the presser and its power-driven actuating means a yieldable connection, and means actuable at will by the operator for moving the presser away from the support.

8. In a power-driven label-affixing apparatus of the kind in which the article to be labeled is mounted on a support, and the label is pressed against the article by a presser device movable toward and from the support, and wherein when the machine stops, the presser is positioned to clamp the article against the support, characterized in that the presser is carried by a lever arm which is normally rocked by a power-driven cam through the intermediary of resiliently yieldable connections, a pedal, and connections from the pedal to said lever arm whereby, when the machine is stopped, the arm may be rocked by depressing the pedal thereby to remove the presser from the article.

9. In a power-driven label-affixing apparatus of the kind in which the article to be labeled is mounted on a support, and the label is pressed against the article by a presser device movable toward and from the support, and wherein, when the machine stops, the presser is positioned to clamp the article against the support, characterized in having a power-actuated cam, a lever arm which carries the presser, a telescopic rod, normally extended by a spring, for transmitting motion from the cam to the lever arm, a pedal, and a rod connecting the pedal and arm whereby depression of the pedal, when the machine is stopped rocks the arm in operation to the action of the spring and lifts the presser from the article.

10. In a machine of the class described wherein a label carrier moves back and forth toward and from a label-affixing station, a vertically movable article support at the affixing station, a label presser movable toward and from the article support, a lever having an arm of gooseneck shape arranged to rock in the vertical plane of the carrier path, the presser being attached to the free end of said lever arm, power driven means including a resiliently yieldable connection for rocking said arm, and manually actuable means for moving said arm so as to raise the presser from an article on the rest when the machine is stopped.

11. A label-applying machine wherein a label carrier moves past a transfer station and past a gumming station and after reversing its direction of movement again passes the gumming station and transfer station and stops at a label-applying station, a pneumatic picker operative to remove a label from a supply and to deliver it to the carriage at the transfer station, a tubular rock shaft, an arm fixed to the shaft and which supports the picker, means providing a duct connecting the picker with the interior of the tubular rock shaft, a valve for controlling the passage of air from the picker to the interior of the rack shaft, valve-actuating means within the rock shaft, means connecting the interior of the rock shaft with a suction pump, and means for rocking the shaft and for actuating the valve means.

12. A label-applying machine wherein a label carrier moves past a transfer station and past a gumming station and after reversing its direction of movement again passes the gumming station and transfer station and stops at a label-applying station, a pneumatic picker operative to remove a label from a supply and to deliver it to the carriage at the transfer station, an arm to one end of which the picker it attached, a tubular rock shaft to which the other end of the arm is secured, means providing a duct connecting the picker with the interior of the tubular shaft, a valve for controlling the passage of air from the picker to the interior of said shaft, a valve-actuating rod within and movable axially of the rock shaft, means connecting the interior of the shaft with a suction pump, means for rocking the shaft, and means for actuating the valve rod, and a manually actuable valve which controls a port leading from the interior of the rock shaft to the atmosphere.

13. A label-applying machine wherein a label carrier moves past a transfer station and past a gumming station and after reversing its direction of movement again passes the gumming station and transfer station and stops at a label-applying station, a pneumatic picker operative to remove a label from a supply and to deliver it to the carriage at the transfer station, an arm to one end of which the picker is attached, a tubular rock shaft to which the other end of the arm is secured, means providing a duct connecting the picker with the interior of the tubular shaft, a valve for controlling the passage of air from the picker to the interior of said shaft, a valve-actuating rod within and movable axially of the rock shaft, means connecting the interior of the shaft with a suction pump, a power-driven shaft, and cam means actuated by said shaft for rocking the tubular shaft and for moving the valve-actuating rod in properly timed relation.

14. A labeling machine having a frame providing a chamber open at its top and at the front of the machine for the reception of a gum receptacle, the chamber having a floor and spaced side walls, and means operative at will to support a gum receptacle in either of two different elevated operative positions or in a position near the floor of the chamber.

SIDNEY T. CARTER.

REFERENCES CITED

The following references are of record in the file of this patent:

UNITED STATES PATENTS

| Number | Name | Date |
|---|---|---|
| 900,816 | Woodland | Oct. 13, 1908 |
| 1,209,191 | Miller | Dec. 19, 1916 |
| 1,315,737 | Milmoe | Sept. 9, 1919 |
| 1,867,038 | Upham | July 12, 1932 |
| 1,909,522 | Stevens | Oct. 21, 1933 |
| 2,154,222 | Von Hofe | Apr. 11, 1939 |
| 2,168,525 | Howard | Aug. 8, 1939 |
| 2,242,974 | Holm | May 20, 1941 |
| 2,257,785 | Carter | Oct. 7, 1941 |
| 2,267,903 | Essen | Dec. 30, 1941 |
| 2,292,093 | Sjoberg | Aug. 4, 1942 |
| 2,319,969 | Bessemer | May 25, 1943 |
| 2,321,661 | Craig | June 15, 1943 |
| 2,347,445 | Von Hofe | Apr. 25, 1944 |
| 2,362,328 | Von Hofe | Nov. 7, 1944 |